(12) United States Patent
Yamaoka et al.

(10) Patent No.: US 8,350,409 B2
(45) Date of Patent: Jan. 8, 2013

(54) SEMICONDUCTOR DEVICE AND INFORMATION PROCESSING APPARATUS USING THE SAME

(75) Inventors: Masanao Yamaoka, Kodaira (JP); Kenichi Osada, Tokyo (JP); Yasuhiro Fujimura, Hamura (JP); Tetsuya Fukuoka, Hamura (JP); Ryo Nishino, Ome (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 12/759,520

(22) Filed: Apr. 13, 2010

(65) Prior Publication Data

US 2010/0264735 A1 Oct. 21, 2010

(30) Foreign Application Priority Data

Apr. 14, 2009 (JP) ................................. 2009-097761

(51) Int. Cl.
*H02J 1/10* (2006.01)
(52) U.S. Cl. .......................................... 307/43; 257/207
(58) Field of Classification Search .................... 307/43, 307/69; 257/207
See application file for complete search history.

(56) References Cited

U.S. PATENT DOCUMENTS

2009/0066160 A1* 3/2009 Katoh ............................. 307/43

FOREIGN PATENT DOCUMENTS

| JP | 2004-111659 A | 4/2004 |
|---|---|---|
| JP | 2007-194456 A | 8/2007 |

* cited by examiner

*Primary Examiner* — Carlos Amaya
(74) *Attorney, Agent, or Firm* — Miles & Stockbridge P.C.

(57) ABSTRACT

Objects of the invention are to minimize power consumption while maintaining the required information processing capabilities of an LSI chip by supplying multiple voltages to the LSI chip such that its circuit blocks receive necessary voltages and to prevent an increase in the chip area of the LSI chip and performance degradation of signal wires, which may result from the supply of the multiple voltages, by reducing the number of power supply wires.

In an LSI chip to which two voltages are supplied, high voltage wires are more densely spaced than low voltage wires. By selectively applying voltages based on circuit block performance, it is possible to reduce power consumption while maintaining the amount of information processed by the LSI chip.

19 Claims, 30 Drawing Sheets

SEMICONDUCTOR DEVICE AND INFORMATION PROCESSING APPARATUS USING THE SAME

CLAIM OF PRIORITY

The present application claims priority from Japanese Patent Application JP2009-097761, filed on Apr. 14, 2009, the content of which is hereby incorporated by reference into this application.

BACKGROUND OF THE INVENTION

1. Field of the Invention

The present invention relates to an information processing apparatus formed by mounting an integrated semiconductor circuit on a board. The invention relates particularly to structures of the apparatus that optimize power consumption by the integrated circuit and the amount of information processed by a semiconductor chip, and minimize the size of the integrated circuit.

2. Description of the Related Arts

Recent years have seen increases in power consumption by information processing apparatuses due to increased amounts of information to be processed by the apparatuses. It is particularly difficult for large-scale integrated (LSI) circuits to reduce power consumption while increasing the amount of information to be processed. The information processing circuits on an LSI chip can enhance their performance when a high voltage is applied thereto, but at the same time consume much power. In contrast, when a low voltage is applied, power consumption can be suppressed, but this reduces the amount of information that can be processed. Patent Document 1 (JP-A-2004-111659) and Patent Document 2 (JP-A-2007-194456) disclose multi-voltage designs for an LSI chip in which voltages are selectively applied to circuit blocks.

SUMMARY OF THE INVENTION

In such an LSI chip as disclosed in Patent Documents 1 and 2, a high voltage is applied to circuit blocks that need to be operated at a high speed, and a low voltage is applied to circuit blocks that do not need to be operated at a high speed for the purpose of reducing power consumption. Thus, it is possible to achieve low power consumption while maintaining the required overall information processing performance of the LSI chip.

However, this multi-voltage method requires supply of multiple voltages to the internal circuit blocks within an LSI chip. Thus, the multi-voltage method results in power supply wires occupying much space, compared with a conventional single-voltage method. Consequently, the areas within an LSI chip in which signal transfer wires are arranged may decrease, or the area of the LSI chip may increase when a particular signal wire is placed. Moreover, performance degradation may result when the number of signal wires is reduced.

Thus, some of the objects of the invention are to minimize power consumption while maintaining the required information processing capabilities of an LSI chip by supplying multiple voltages to the LSI chip such that its circuit blocks receive necessary voltages and to prevent an increase in the chip area of the LSI chip and performance degradation of signal wires, which may result from the supply of the multiple voltages, by reducing the number of power supply wires.

In a representative information processing apparatus according to the invention, two voltages are supplied to its LSI chip. In the LSI chip, circuit blocks to which a high voltage is supplied excel in performance and consume large power. Thus, a large electric current runs therethrough. In contrast, circuit blocks to which a low voltage is supplied are low in performance level and consume low power. Thus, a small electric current runs therethrough. This means that high voltage wires and low voltage wires require different densities or space occupation rates.

By exploiting that principle, the density of the high voltage wires is made larger, and the density of the low voltage wires is made smaller.

In accordance with the invention, it is possible to minimize power consumption while maintaining the required information processing capabilities of an LSI chip by supplying multiple voltages to the LSI chip such that its circuit blocks receive necessary voltages. Moreover, it is possible to prevent increases in the number of power supply wires and the area of the LSI chip by changing the density of power supply wires according to voltages to be supplied. Furthermore, it is possible to enhance the operating performance of circuits by increasing the areas in which signal wires are arranged.

DETAILED DESCRIPTION OF THE PREFERRED EMBODIMENTS

Embodiments of the present invention will now be described in detail with reference to the accompanying drawings.

Embodiment 1

Figure 1:
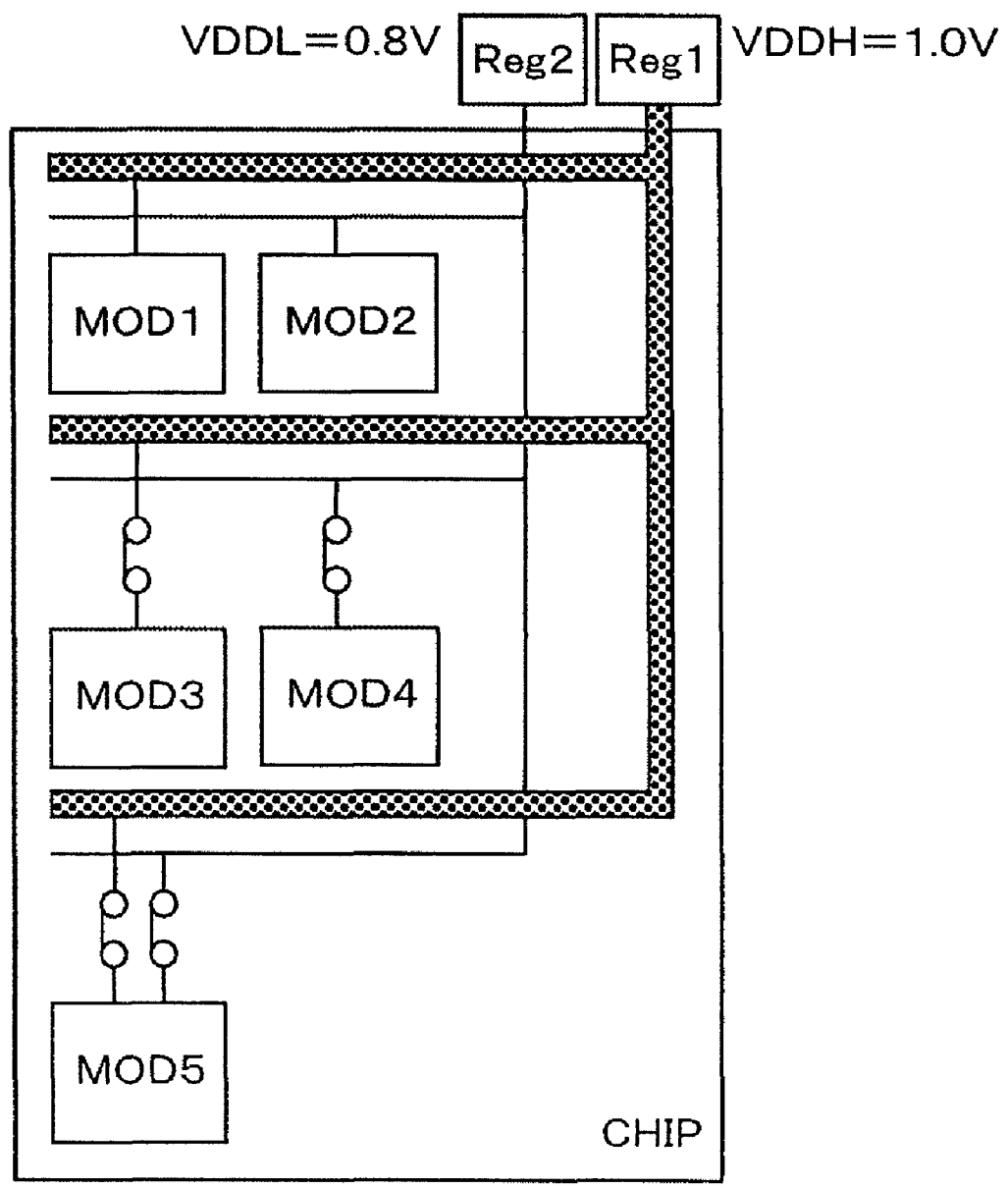
FIG. 1 is a diagram illustrating the internal structure of an LSI chip according to the invention and its system for supplying power to the LSI chip.

FIG. 1 illustrates the internal structure of an LSI chip according to Embodiment 1 of the invention and its system that supplies electric power to the chip. In FIG. 1, 'CHIP' represents the LSI chip; 'MOD1' to 'MOD 5' are modules each with a particular function; 'VDDH' and 'VDDL' are two supply voltages; 'REG1' is a regulator for supplying VDDH; and 'REG2' is a regulator for supplying VDDL. As can be seen from FIG. 1, the LSI chip of Embodiment 1 includes five modules: MOD1 to MOD 5. The word 'module' refers to a CPU, a DSP, or a similar circuit block with a particular function. VDDH is a voltage of 1.0V, and VDDL is a voltage of 0.8V. These voltages are supplied to the LSI chip.

The use of a high voltage to operate a circuit improves the operating speed or performance of the circuit, but it increases power consumption as well. The use of a low voltage, in contrast, reduces power consumption, but it also degrades the operating performance of the circuit.

Therefore, an efficient power supply method is to apply a high voltage to modules that need to be operated at a high operating speed and to apply a low voltage to modules that need not to be operated at a high operating speed. This method satisfies the required overall operating speed of an LSI chip and also reduces power consumption by the chip.

For this reason, the modules MOD1 and MOD3 of the LSI chip of Embodiment 1 receive VDDH (i.e., high voltage) because those modules need to be operated at a high operating speed (e.g., an operating frequency of 800 MHz). In contrast, the modules MOD2 and MOD4 receive VDDL (i.e., low voltage) because those modules are operated at a low operating speed (e.g., an operating frequency of 300 MHz).

The modules MOD3 and MOD4 each include a power switch to receive or shut off supply voltages. When those modules MOD3 and MOD4 are not in operation, their respective switches shut off supply voltages. Thus, the LSI chip of Embodiment 1 consumes less power when the modules MOD3 and MOD4 are not in operation.

The module MOD5 includes two switches and receives or shuts off VDDH (high voltage) and VDDL (low voltage). Thus, the module MOD5 is capable of selecting VDDH or VDDL. For example, when the module MOD5 is operated at a frequency of 800 MHz, VDDH is supplied to the module MOD5 to enable high speed operation. When the module MOD5 is operated at a frequency of 300 MHz, VDDL is supplied to the module MOD5 to reduce power consumption. Further, by the switches of the module MOD5 shutting off supply voltages when it is not in operation, the LSI chip consumes less power during that time.

As stated above, the LSI chip has two power sources, that is, REG1 that supplies VDDH and REG2 that supplies VDDL, and these voltages VDDH and VDDL are selectively supplied to the modules based on their performance levels. Thus, the LSI chip of Embodiment 1 excels in performance and at the same time consumes less power.

We now discuss the power supply wires through which to supply the voltages. Since VDDH is a high voltage, the modules that receive VDDH consume relatively a large amount of power, which means that a large amount of electricity runs through those modules. In contrast, the modules that receive VDDL (low voltage) consume a small amount of power, which means a small amount of electricity runs through those modules. On the face of it, supply of the two voltages to the LSI chip seems to require twice the amount of wiring, but in fact, this is not the case because VDDH and VDDL are different in voltage value. That is, wires thick enough to allow a high current density can be used to run VDDH therethrough, and thin wires can be used to run VDDL therethrough. This is illustrated by the widths of the power supply wires of FIG. 1.

As already stated, FIG. 1 illustrates an example in which the LSI chip includes five modules: MOD1 (without a switch) that receives a high voltage; MOD3 (with a switch) that receives a high voltage; MOD2 (without a switch) that receives a low voltage; MOD4 (with a switch) that receives a low voltage; and MOD5 (with two switches) that selectively receives a high or low voltage. However, achieving the above-described effects of the invention does not always necessitate the use of all the five modules, but two of them will do for that purpose. Moreover, even when three or more voltages, instead of the two voltages, are applied to the LSI chip, the above-described effects of the invention can also be achieved by a similar circuit configuration.

Figure 2:
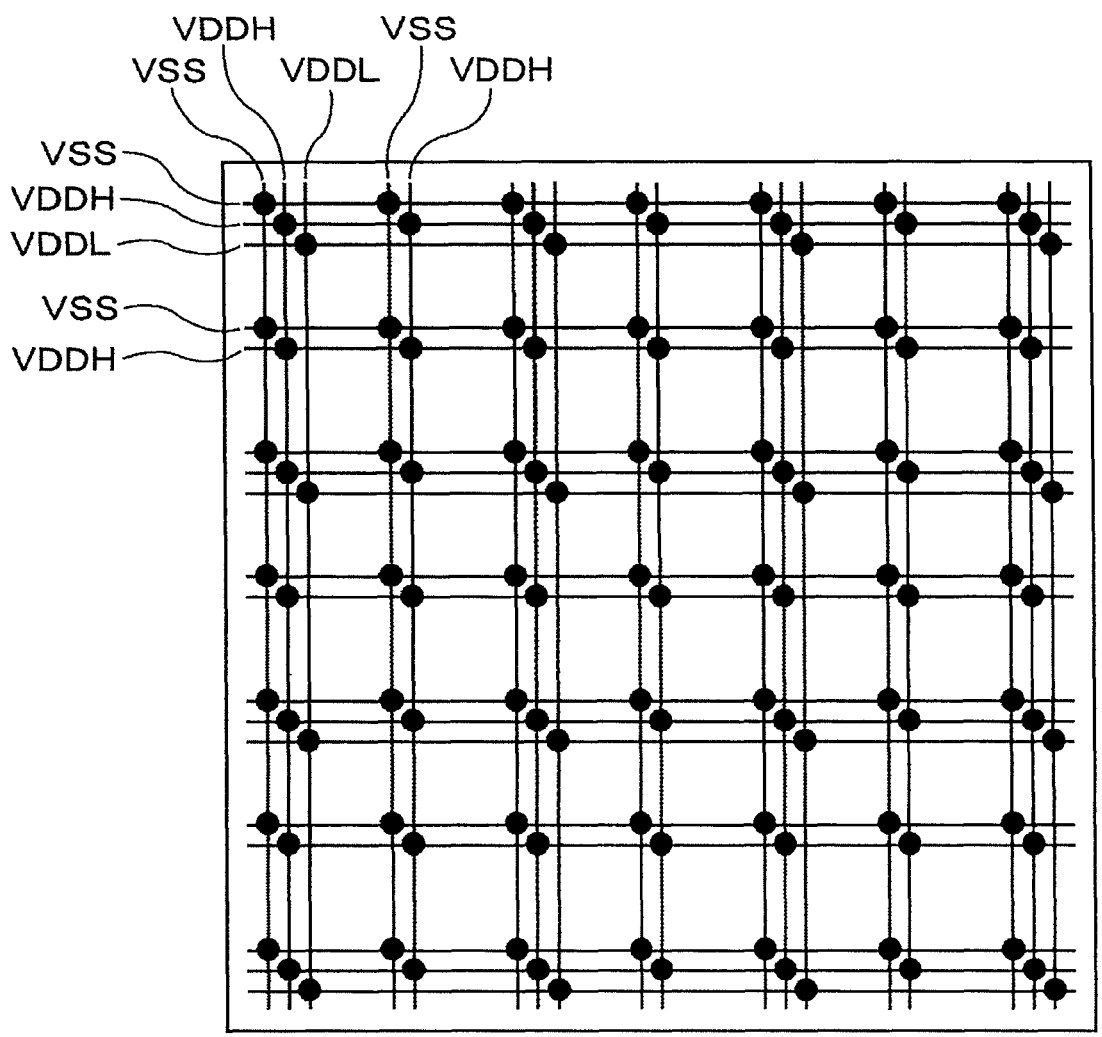
FIG. 2 is a diagram illustrating power supply wires of an LSI chip according to the invention.

FIG. 2 is an example of power supply wires used in Embodiment 1. FIG. 2 illustrates wires on a relatively upper layer such as a metal eighth or ninth layer. Ground potential wires VSS and high-voltage supply wires VDDH are densely spaced. In contrast, low-voltage supply wires VDDL are sparsely spaced. In fact, the density of the wires is such that the ratio of the VDDH wires to the VDDL wires is 2 to 1. By supplying voltages using wires of deferent densities, it is possible to suppress the space occupation rate of the supply wires when two voltages are supplied, which leads to suppression of influences of signals or the like on the wires.

Figure 3:
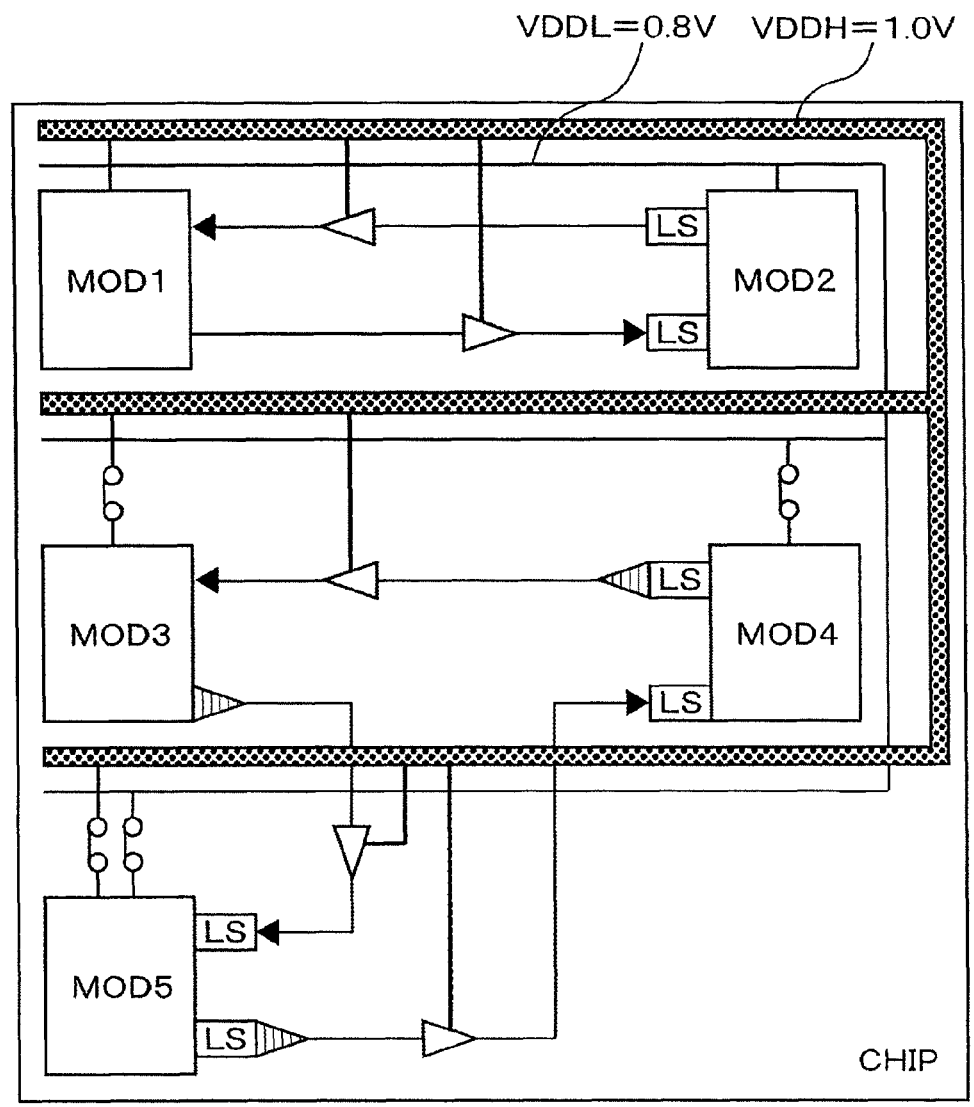
FIG. 3 is a diagram illustrating the relationship between an inter-module signal transfer scheme inside an LSI chip according to the invention and power supply.

FIG. 3 is a schematic illustrating the relationship between an inter-module signal transfer scheme inside the LSI chip of Embodiment 1 and power supply. In FIG. 3, MOD1 to MOD5 represent modules each with a particular function, LS represents a level shifter, ISO is an isolation buffer that prevents unstable propagation of signals, and BUF is a buffer that transfers signals between modules. MOD1 to MOD5 have the same circuit configuration as in FIG. 1. FIG. 3 is distinctive in the following three respects.

First, level shifters are present. Since the invention uses two supply voltages, voltage translation is required when signals are transferred between modules that require different voltages. In the invention, level shifters are inserted at the vicinity of the signal input/output units of modules to which a low voltage is supplied, and the level shifters perform voltage translation there. That is, level shifters are inserted at the input/output units of MOD2 and MOD 4 that always operate at a low voltage and those of MOD 5 that may operate at a low voltage. Voltage translation by the level shifters enables normal signal transfer.

By providing level shifters to the input/output units of all the modules that may operate at a low voltage, the design process of a two-voltage LSI chip becomes much simpler because there is no need to consider which destination to transfer signals.

Figure 4:
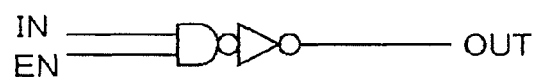
FIG. 4 is a diagram illustrating a circuit for preventing signal propagation according to the invention.

Secondly, isolation buffers are present. Even when the isolation buffers receive unstable signals, they do not propagate the signals. For example, as in FIG. 4 in which an AND gate is used, a signal input to IN is transferred to OUT while EN is 'H,' but the output is clamped to 'L' while EN is 'L.'

In FIG. 3, the isolation buffers are inserted at the output units of MOD3, MOD4, and MOD5 that shut off power with their respective switches. When power is shut off, power to the signal output circuits inside the modules is also shut off. Thus, their output becomes unstable. The absence of the isolation buffers may cause transfer of this unstable signal, which in turn causes circuit malfunction or a flow of a large current called a feed-through current into a circuit. The insertion of the isolation buffers prevents propagation of such unstable signals.

Thirdly, all the buffers BUF to transfer signals are driven by VDDH or a high voltage. When the level shifters are inserted at the vicinity of modules that operate at a low voltage, all signals become high-voltage signals. Thus, the buffers BUF that relay signals also receive high voltages. With the insertion of the level shifters, signal transfer becomes possible regardless of the voltage difference between input-side modules and output-side ones, which in turn simplifies the design process of an LSI chip. Further, since high-voltage wires are densely spaced in the LSI chip of Embodiment 1, high voltages can be used easily at any location within the chip. Embodiment 1 is an example in which MOD1 is connected to MOD2, and MOD3, MOD4, and MOD5 are connected together. However, even when those modules are connected to other modules, signal transfer is possible by a configuration similar to that of Embodiment 1.

Figure 5:
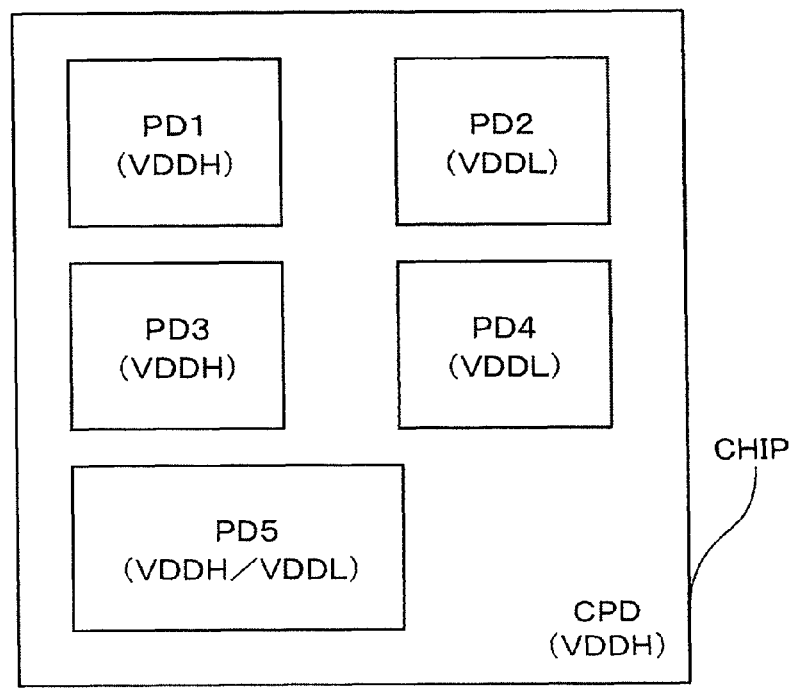
FIG. 5 is a diagram illustrating a power domain setting for an LSI chip according to the invention.

FIG. 5 illustrates a power domain setting according to the invention. PD represents a power domain. The modules MOD1 to MOD5 of FIG. 1 that receive different voltages are set as power domains PD1 to PD5, respectively. The other circuits located outside the modules are set within a common power domain CPD. Buffers that transfer signals between the modules and buffers that transfer clock signals are set within CPD. CPD receives VDDH (high voltage), and all the circuit components on CPD are driven by VDDH. Thus, inter-module signal transfer is performed with VDDH.

Figure 6:
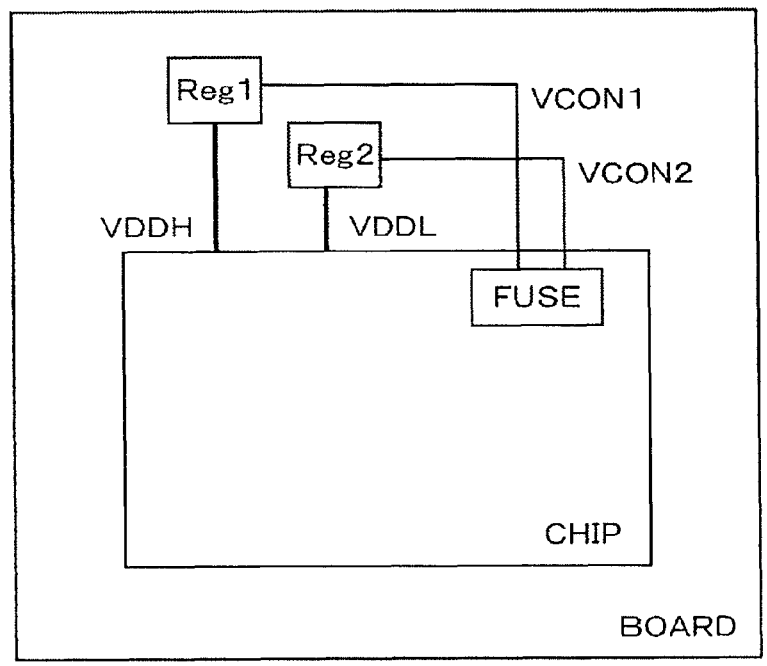
FIG. 6 is a diagram illustrating a system to which the invention is applied.

FIG. 6 illustrates a system including the LSI chip of Embodiment 1 and the regulators that supply power to the LSI chip. In FIG. 6, BOARD is a system board on which are mounted the LSI chip and the regulators REG1 and REG2 that supply power to the LSI chip. Provided within the LSI chip 'CHIP' is a fuse circuit FUSE that stores device information of the LSI chip. Using information stored by a non-volatile memory circuit or the like, FUSE outputs two signals VCON1 and VCON2 that are used to control regulator voltages. Based on that information, output signals from the regulators REG1 and REG2 are adjusted. When, for example, threshold voltage values (Vth) of transistors on the LSI chip are low, the system lowers supply voltages because the circuit operation within CHIP is fast during that time. This makes it possible to reduce power consumption while maintaining the required operating speed. Since CHIP of Embodiment 1 uses two voltages, voltage control signals are input to both of the regulators that supply two voltages.

Figure 7:
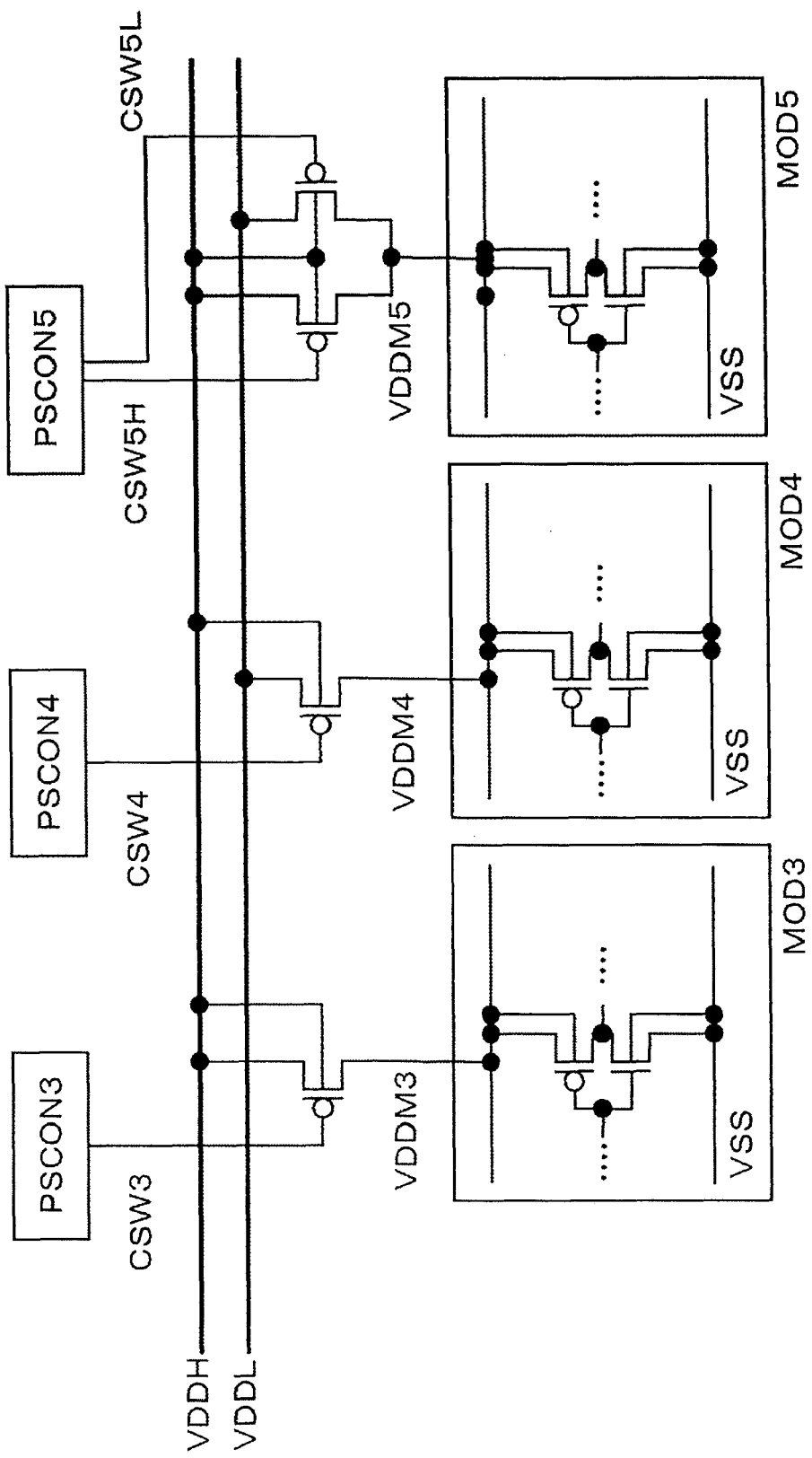
FIG. 7 is a diagram illustrating the relationship between power supply to an LSI chip according to the invention and power switches.

FIG. 7 illustrates the relationship between power supply to the LSI chip of Embodiment 1 and power switches. The modules MOD3, MOD4, and MOD5 each include a power switch to receive or shut off power. Each switch is a PMOS transistor and connected to a power supply wire and to an intra-module local power supply unit VDDM3, VDDM4, or VDDM5. PSCON3, PSCON4, and PSCON5 are circuits to control the power switches and output switch control signals CSW3, CSW4, CSW5H, and CSW5L. For example, when the module MOD3 is operated, CSW3 becomes 'L,' and the local power supply unit VDDM3 of MOD3 is then connected to a VDDH wire. Thereafter, power is supplied to MOD3, and MOD3 starts normal operation.

When the module MOD5 is operated at a high speed, CSW5H becomes 'L,' and the local power supply unit VDDM5 of MOD5 is then connected to the VDDH wire. Thereafter, a high voltage is supplied to MOD5, and MOD5 starts fast operation. When MOD5 is operated at a low speed, CSW5H becomes 'H,' and VDDM5 is electrically separated from the VDDH wire. Subsequently, CSW5L becomes 'L,' and VDDM5 is connected to a VDDL wire. A low voltage is then supplied to MOD5, and MOD5 starts low-speed operation. At this time, power consumption is low. When MOD5 is not to be operated, both CSW5H and CSW5L become 'H,' and VDDM5 is electrically separated from the VDDH and VDDL wires so that no power is supplied to MOD5. At this time, MOD5 consumes less power. In FIG. 7, the substrate terminals of the PMOS transistors that constitute the power switches are all connected to the VDDH wire.

With the above configuration, all the power switches can be placed within the common power domain CPD, so that the installation of the switches does not lead to an area increase. Note that reverse-directional substrate bias is applied to a power switch when the switch is connected to the VDDL wire, and an ON current at the start of operation is low. Also, the power domains each include a circuit formed by NMOS and PMOS transistors. Of these, the substrate terminals of the NMOS transistors are connected to ground potential wires VSS, and the substrate terminals of the PMOS transistors are connected to the local power supply units VDDM 3 to 5.

Figure 8:
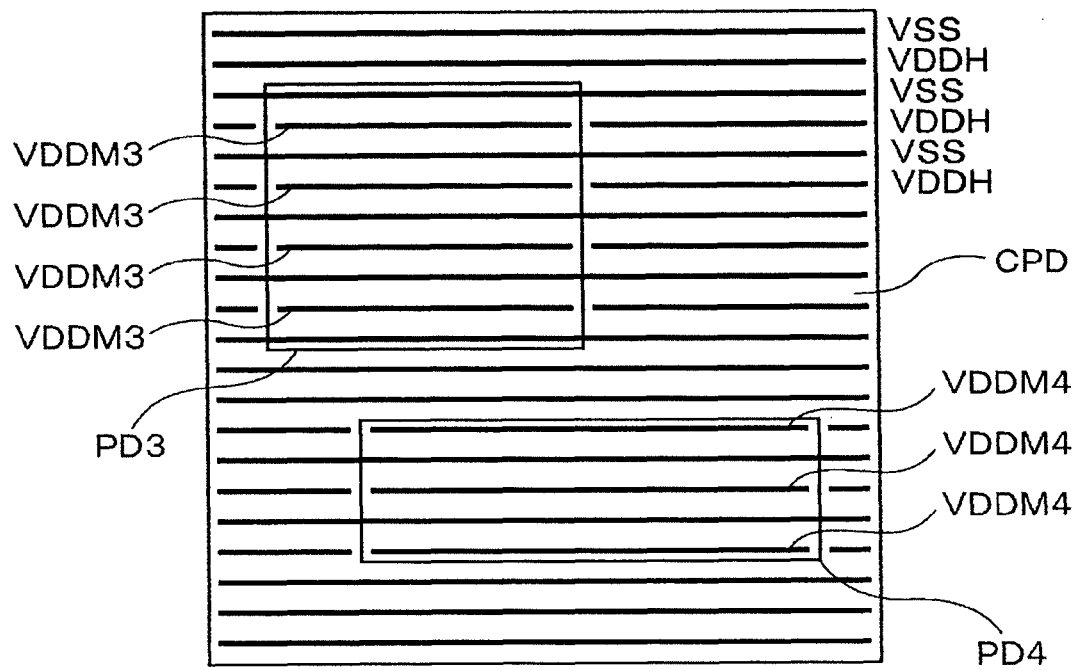
FIG. 8 is a diagram illustrating metal wires on a power supply bottom layer of an LSI chip according to the invention.

FIG. 8 illustrates the metal wires on the power supply bottom layer of the LSI chip of Embodiment 1. In FIG. 8, the LSI chip includes the power domains PD3 and PD4. FIG. 8 illustrates only a logic circuit portion in which common logic cells called standard cells are arranged, without illustrating special circuit portions in which power supply wires are arranged irregularly. In a typical LSI chip, power is supplied to its standard cells. Thus, for power supply, metal wires on its bottom layer (M1: metal first layer) are arranged in the form of horizontal stripes. Since ground potential wires VSS are shared among PD3, PD4, and the common power domain CPD, the wires VSS are arranged regularly within CHIP.

VDDH wires are arranged within CPD to supply VDDH (high voltage) to CPD. Within PD3, local power supply wires VDDM3 are arranged in the rows in which VDDH wires are arranged within CPD because VDD3 are supplied within PD3 via a power switch. Similarly, VDDM4 wires are arranged within PD4. Supplied to these wires is VDDH or VDDL via a power switch. Most of current LSI chips adopt a structure in which a third metal wire layer (M3: metal third layer) from the bottom is placed on its metal first layer (M1). In such an LSI chip, wiring on M3 is similar to that of FIG. 8.

Figure 9:
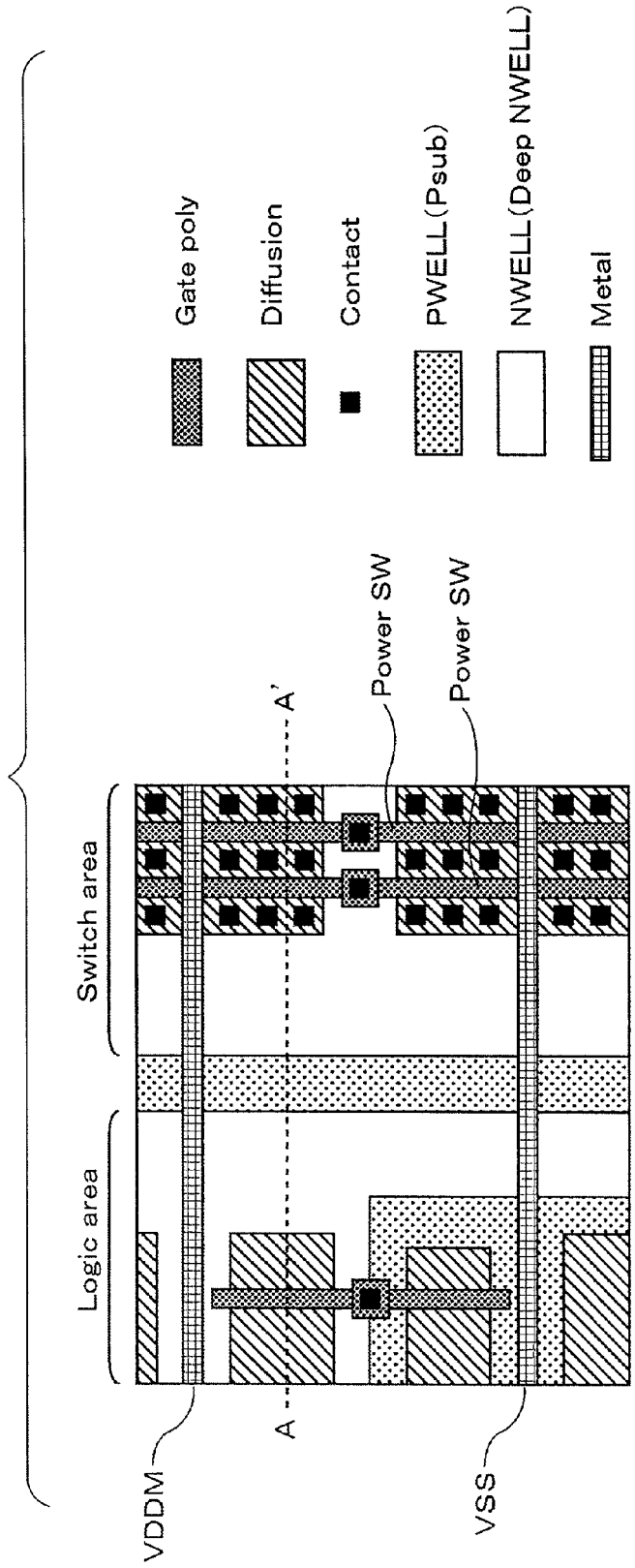
FIG. 9 illustrates an arrangement of power switches of an LSI chip according to the invention.

FIG. 9 illustrates an arrangement of power switches according to Embodiment 1. In FIG. 9, 'Gate poly' represents the gate polysilicon of a transistor; 'Diffusion" a diffusion layer; 'Contact' a metal contact for connection between polysilicon or the diffusion layer and a metal wire; PWELL (Psub) a p-well or a p-substrate; NWELL (Deep NWELL) an n-well or a deep n-well which is formed at a deeper portion than a common well; and 'Metal" a metal wire. FIG. 9 assumes the use of a triple well structure. The two metal wires of FIG. 9 are the ones taken from FIG. 8 and correspond to a VSS wire and a VDDM wire (in FIG. 8, VDDM3 and VDDM4).

Figure 10:
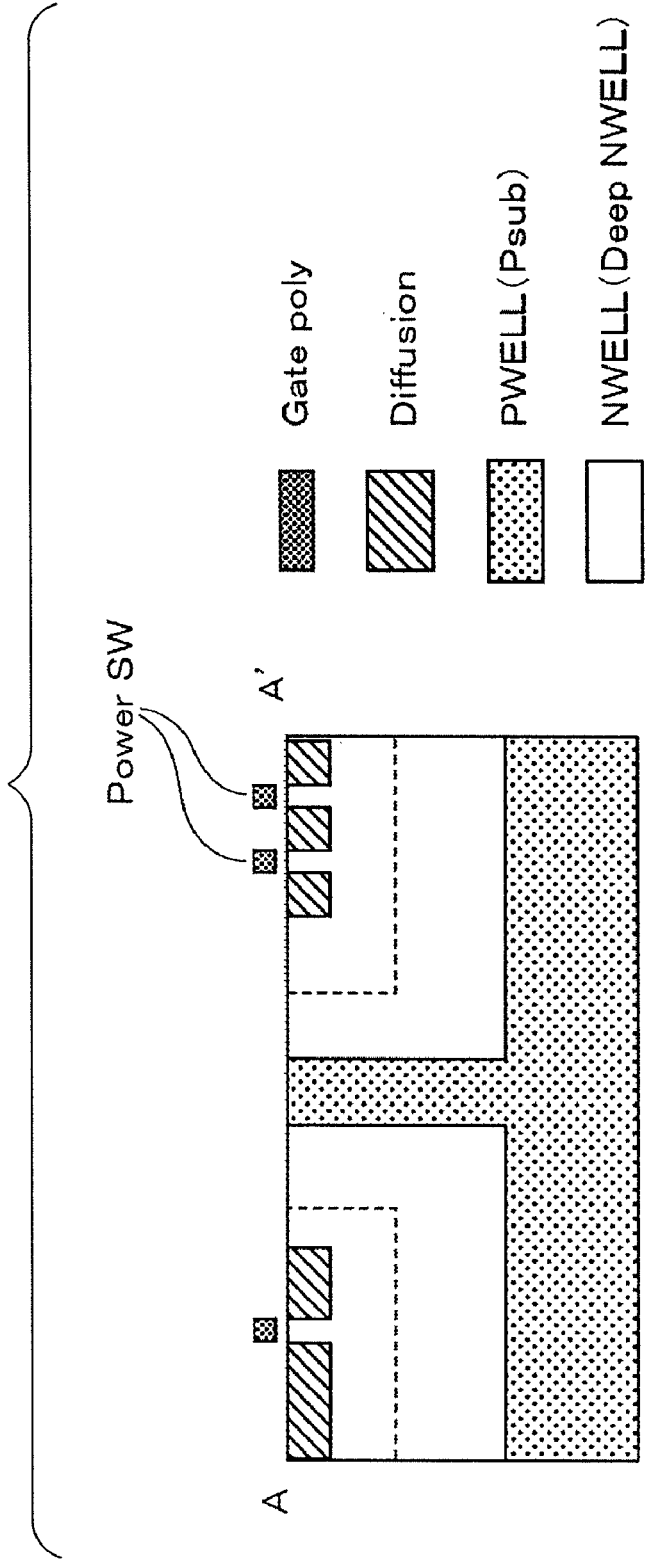
FIG. 10 is a cross-section of power switches of an LSI chip according to the invention.

In FIG. 9, the left-side area (logic area) is the area in which logic circuits within a power domain is placed. The n-well to which the substrate terminals of its PMOS are connected is connected to a local power supply wire VDDM, as also illustrated in FIG. 7. The right-side area (switch area) of FIG. 9, on the other hand, is the area in which PMOS constituting a power switch is placed. The n-well to which the substrate terminals of its PMOS are connected is connected to a VDDH wire, as also illustrated in FIG. 7. Therefore, the n-well within the logic area needs to be electrically separated from the n-well within the switch area. In a triple well structure with deep n-wells, a n-well is connected to a deep n-well. Thus, the separation of the deep n-wells is necessary in each area. To do so, a p-substrate is placed between two deep n-wells. A cross-section taken along line A-A' of FIG. 9 is presented in FIG. 10. As can be seen from FIG. 10, a p-substrate between the switch area and the logic area separates n-wells and deep n-wells.

Figure 11:
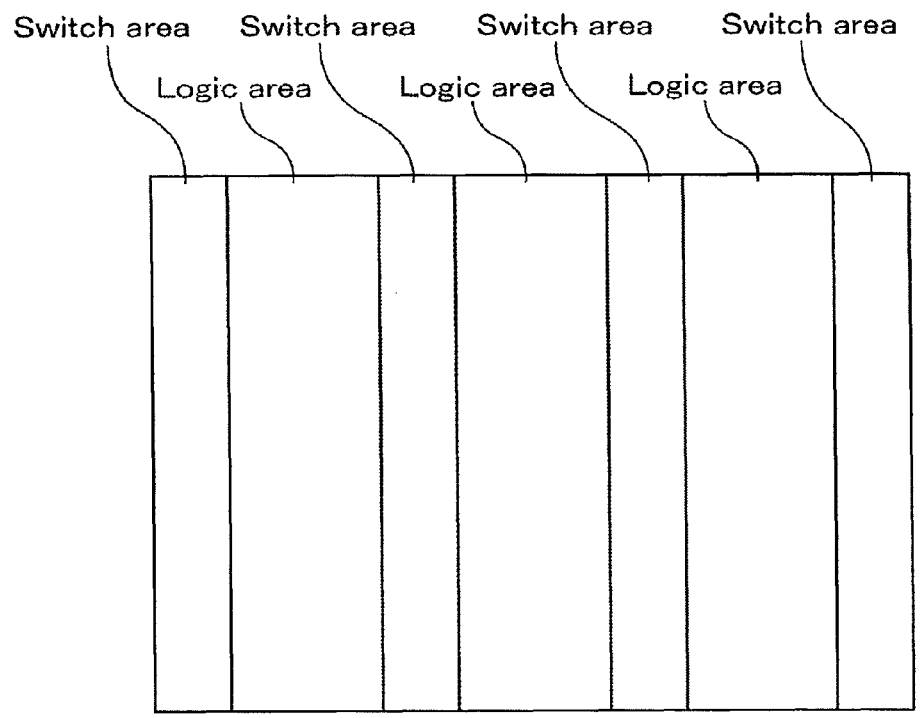
FIG. 11 is a diagram illustrating an arrangement of power switches of modules across an LSI chip according to the invention.

FIG. 11 illustrates an arrangement of switch areas across the entire modules. The switch areas, or areas for switch placement, are arranged at particular intervals within logical areas in which logical circuits are placed. Switches to shut off power need to have a certain size because an electric current needs to be supplied to a circuit when the circuit needs to be operated. Further, because power is supplied through the supply wires on a relatively lower layer such as M1 and M3 from a power switch to a circuit that needs to be operated, a wide space between power switches results in the wires on the lower layer experiencing a supply voltage fall, which in turn degrades circuit performance. Thus, power switches need to be placed within modules. However, when a particular module consumes a small electric current, a power switch can be placed on an edge of that module. In that case, too, enough current supply can be ensured.

Figure 12:
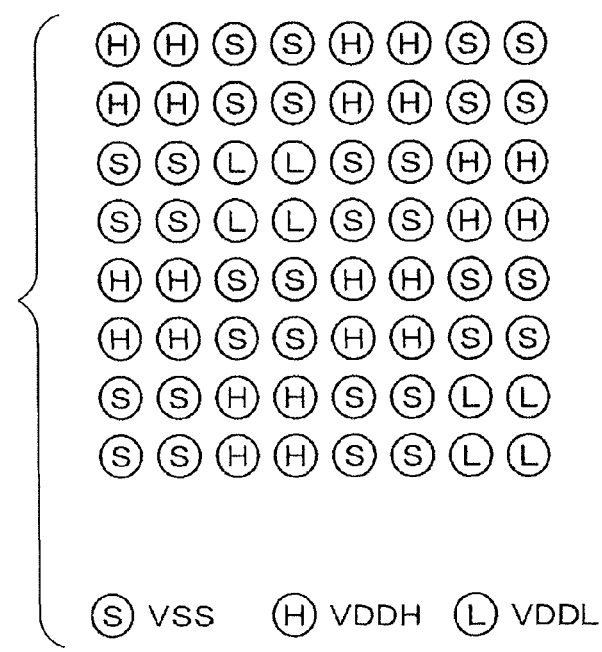
FIG. 12 illustrates an example of the allocation of metal bumps for power supply to an LSI chip according to the invention.

FIG. 12 illustrates an example of the allocation of metal bumps for power supply to the LSI chip of Embodiment 1. In a current LSI chip which consumes relatively high power, metal bumps are formed on the surface of the chip for supply of large power. In a conventional configuration, metal bumps are allocated evenly for different voltages. In the case of a multi-voltage design with low and high voltages, however, modules that receive the low voltage consume low power, and an electric current that needs to be supplied to the modules is also small. Accordingly, the number of power supply bumps allocated for a high voltage VDDH is made larger than the number of those allocated for a low voltage VDDL. This allows efficient supply of power.

Figure 13:
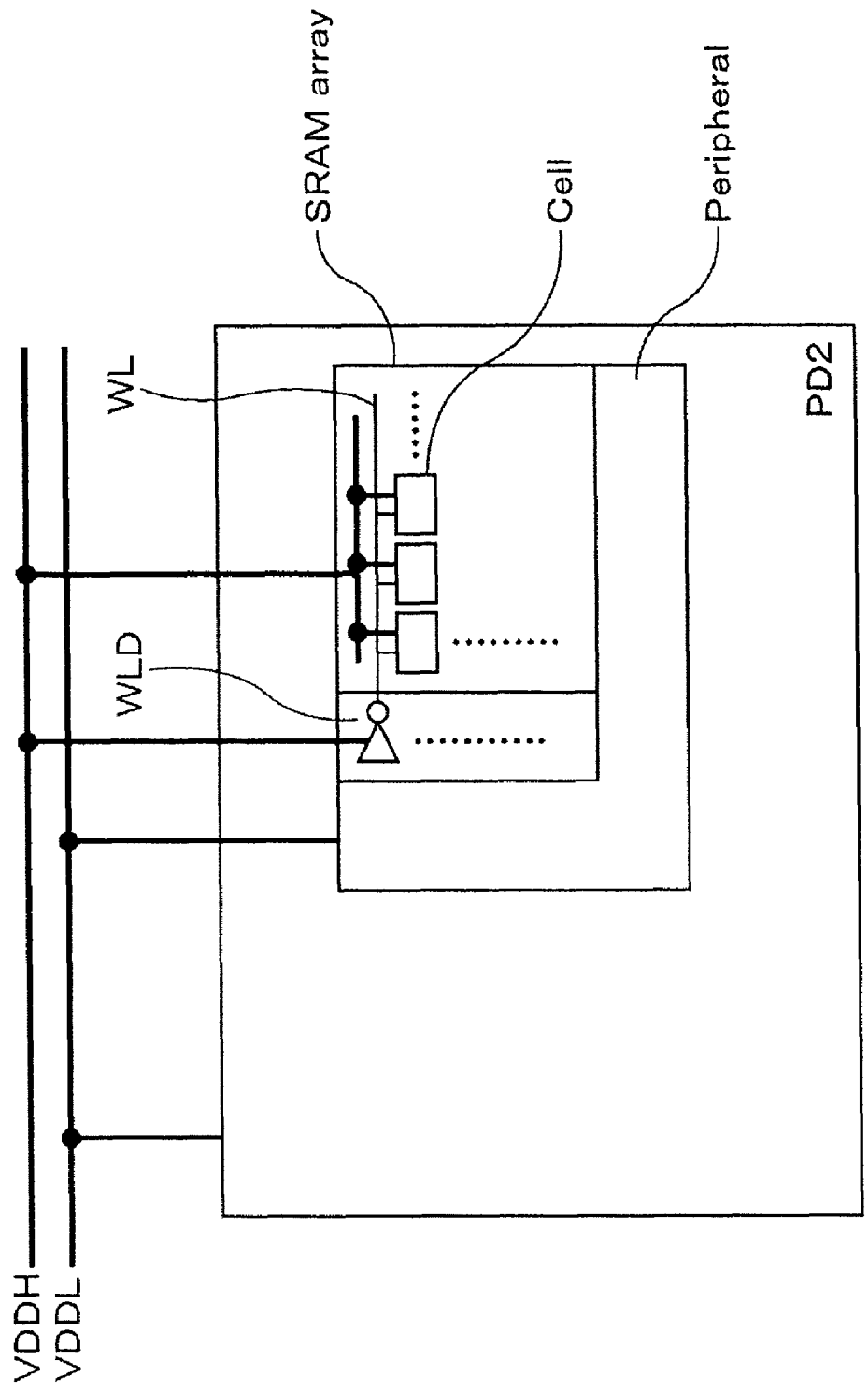
FIG. 13 illustrates the power supply configuration of an SRAM circuit used for an LSI chip according to the invention.

FIG. 13 illustrates the power supply configuration of an SRAM circuit used for the LSI chip of Embodiment 1. FIG. 13 is an example of the power domain PD2 in which a low voltage VDDL is supplied to its logic circuit. Since the 90 nm manufacturing process, supply voltage reduction has been a difficult challenge for SRAM circuits due to transistor performance variations. However, when a high voltage is applied to a power supply unit and a word line of memory cells, which are subject to influences of transistor performance variations, the memory cells can operate properly. In FIG. 13, therefore, a high voltage VDDH is applied to a word driver WLD that drives the power supply unit and the word line WL of the memory cells, and a low voltage VDDL is applied to a peripheral circuit Peripheral, which is used to access SRAM memory cells Cell, but not to a SRAM array in which the SRAM memory cells are arranged in the form of an array. This allows the operation of the peripheral circuit at a low voltage without compromising the operating performance of SRAM and low power operation at a low speed as in a logic circuit. Further, because the same supply voltage is present at the boundary between SRAM and a logic circuit, a level shifter, that is, a voltage translator, is not required between SRAM and the logic circuit. This prevents performance degradation due to the installation of SRAM and simplifies the design process.

Figure 14:
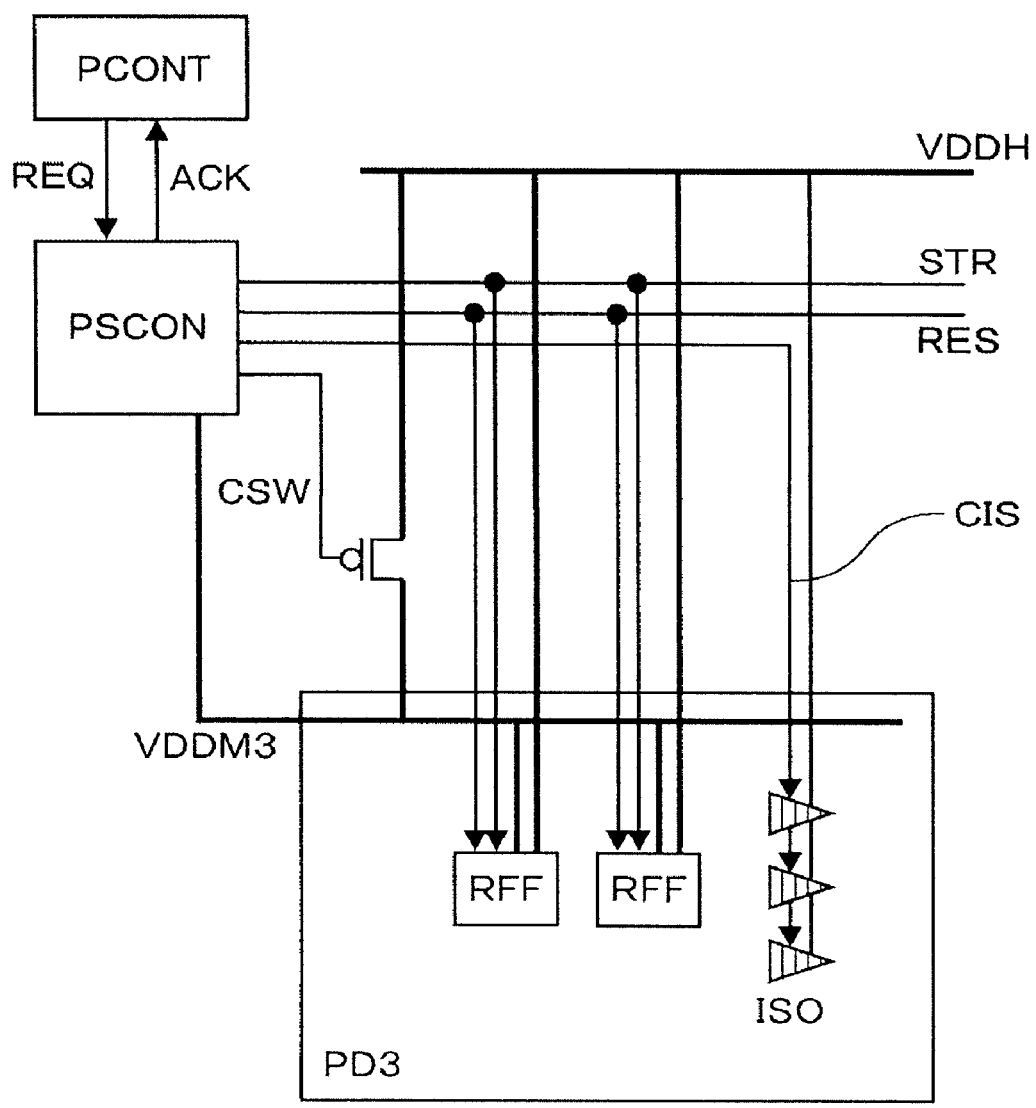
FIG. 14 illustrates the configuration of control circuitry used to control a power switch of an LSI chip according to the invention.

FIG. 14 illustrates the configuration of control circuitry used to control a power switch. In FIG. 14, PCONT represents a circuit used to control the operation of a module; PSCON a power switch control circuit that actually controls the power switch and its associated circuits after receiving an operational mode control signal REQ from PCONT; ISO an isolation buffer that prevents propagation of unstable signals to output signals; and RFF a retention flip flop (FF) circuit capable of retaining data even after power shut-off by the power switch. The operation of this control circuitry is now described with reference to FIGS. 15 and 16.

Figure 15:
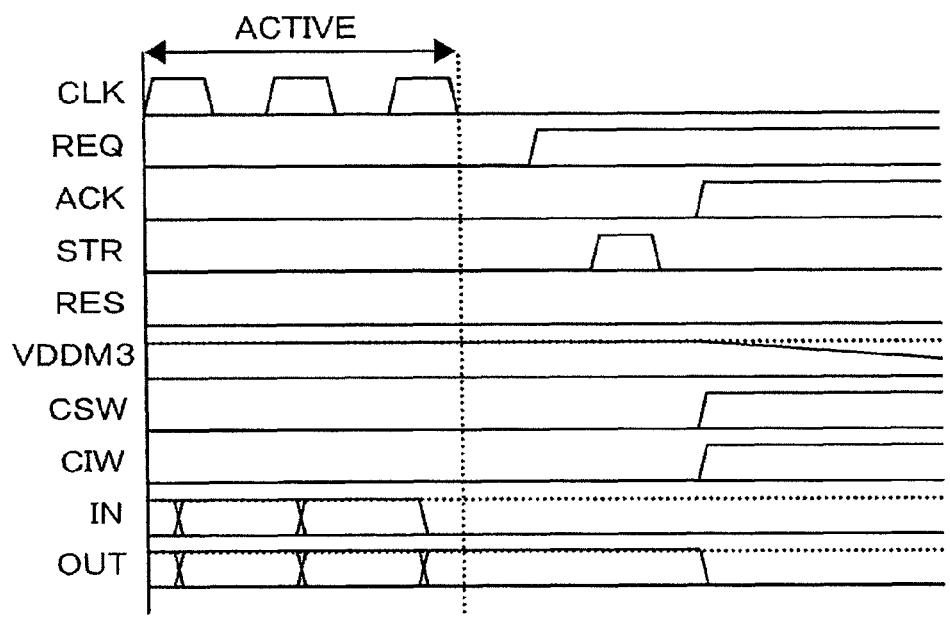
FIG. 15 is a diagram illustrating a control sequence for controlling a power switch of an LSI chip according to the invention.
Figure 16:
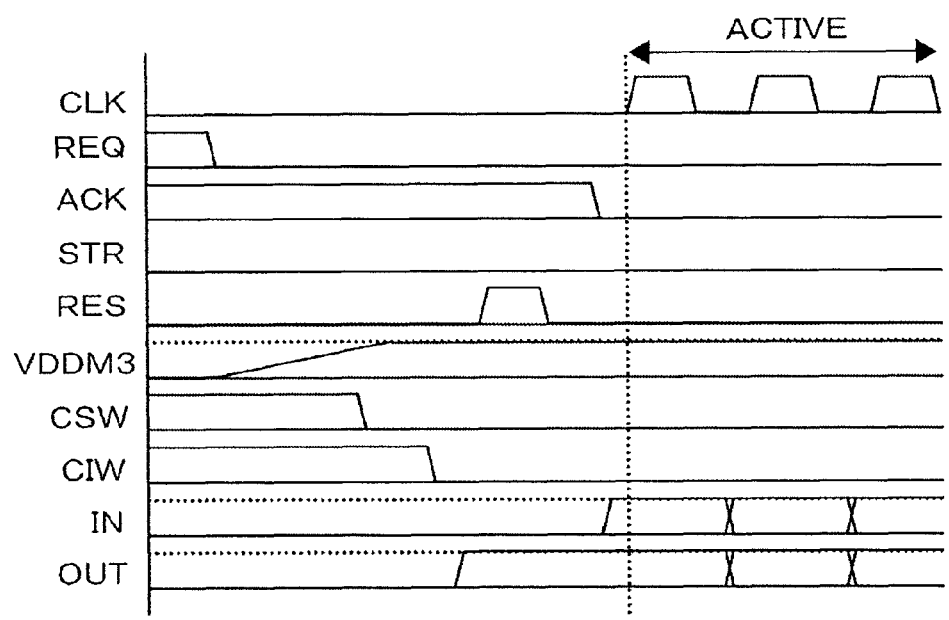
FIG. 16 is a diagram illustrating a control sequence for controlling a power switch of an LSI chip according to the invention.

In FIGS. 15 and 16, CLK represents a clock signal supplied to the module; REQ a voltage control signal output from the circuit PCONT of FIG. 14 that controls the operation of the module; ACK a signal output from the power switch control circuit PSCON to PCONT to indicate that the power switch is in a shut-off state; STR a signal used to execute a data retention operation at the retention flip flop circuit RFF that retains data even after power shut-off within the module; RES a signal used to execute an operation for returning data retained at RFF to a flip flop portion; VDDM3 the potential of the local power supply unit of the power domain PD3; CSW a signal used to control the power switch; CIW a signal used to control an isolation buffer; IN a signal input to the module; and OUT a signal output from the module.

FIG. 15 illustrates the waveforms of the above signals upon power shut-off from an active state of a circuit. In FIG. 15, ACTIVE indicates the circuit is in operation. Upon power shut-off, a clock signal input to the module is stopped, and REQ is asserted to 'H.' This causes PSCON to generate the signal STR for retaining data at the retention FF, and the retention FF stores data. Thereafter, the ACK signal to indicate power is shut off becomes 'H,' and the power switch control signal CSW becomes 'H,' too. The power switch is then shut off, causing the potential of VDDM3 to decrease gradually. At the same time, the signal CIW to control the isolation buffer becomes 'H,' and the output signal OUT from the module is clamped to 'L.'

FIG. 16 illustrates the waveforms of the above signals upon power return after power shut-off. To return power, 'L' is input to the signal REQ. This causes the power switch control circuit PSCON to gradually bring the potential of VDDM3 closer to VDDH, or the power supply potential. After the potential of VDDM3 reaches a particular value or higher, CSW becomes 'L,' thereby stopping the power shut-off and connecting VDDM3 to VDDH. After the connection between the VDDM3 and VDDH, CIW becomes 'L,' and the output signal clamping by the isolation buffer is released. Also, the RES signal is input to RFF, and the data retained upon the power shut-off is returned to the flip flop portion of RFF. After the completion of the above operations, the ACK signal becomes 'L,' and PSCON notifies PCONT that the power switch can be operated. With the input of this ACK signal, PCONT resumes the operation of the module.

In FIG. 14, because RFF needs to retain data even after power shut-off, RFF is connected to VDDM3, that is, the local power supply voltage to be shut off, and also to VDDH, that is, the voltage not to be shut off. Further, because the isolation buffers ISO are required to output constant signals even after power shut-off, they are connected to a VDDH wire to which a voltage is applied constantly, not to the local power supply voltage VDDM3 to be shut off. Upon power return after power shut-off, the power switch is not turned on right after the input of REQ, but turned on after PSCON brings the potential of VDDM3 to somewhat closer to VDDH. When the power switch is turned on with the potential of VDDM3 being low, a large electric current flows from VDDH through the power switch to the local power supply wire VDDM3, causing noise in VDDH. Because VDDH is connected to the domain circuits other than PD3, the noise in VDDH may cause malfunctions of the domain circuits other than PD3. To prevent the malfunctions, control is exercised such that the potential of VDDM3 may not rise to the VDDH potential rapidly.

Figure 17:
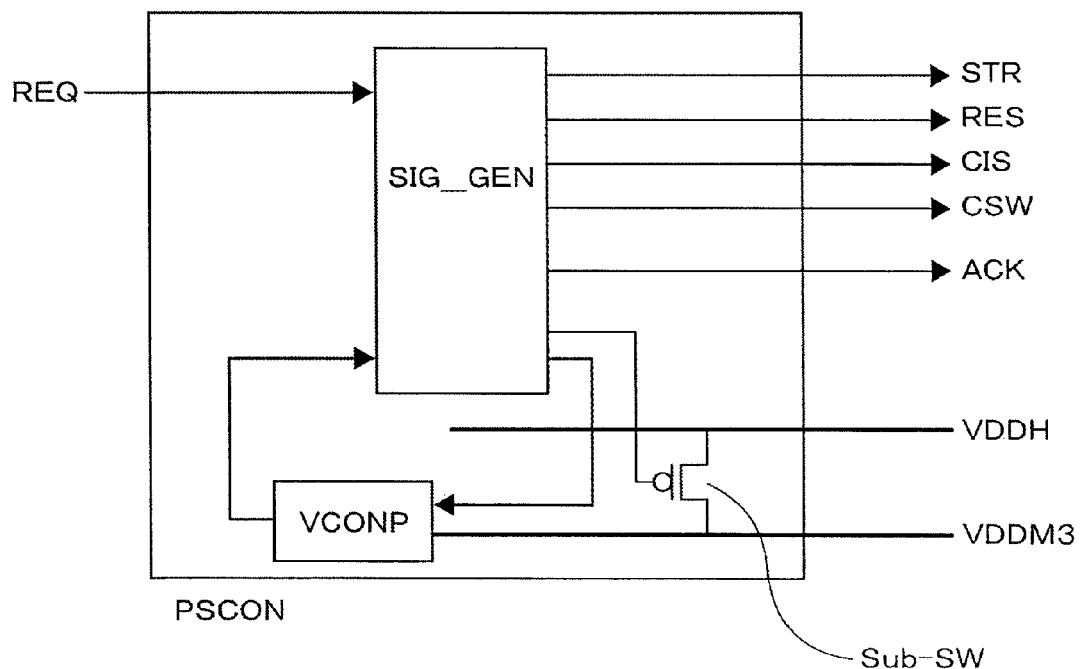
FIG. 17 is a diagram illustrating a power control circuit of an LSI chip according to the invention.
Figure 18:
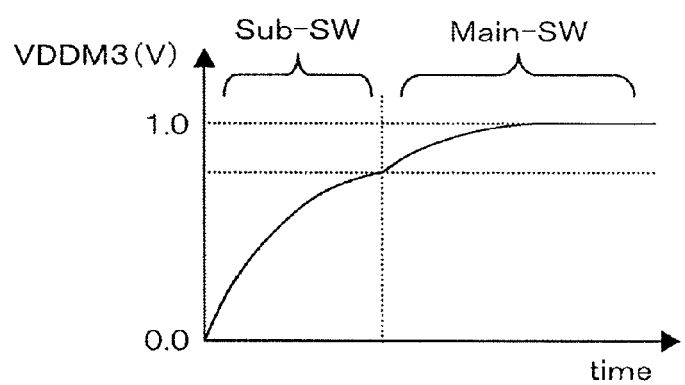
FIG. 18 is a graph illustrating changes in power supply voltage of an LSI chip according to the invention.

FIG. 17 illustrates the internal circuitry configuration of PSCON. In FIG. 17, SIG_GEN is a logic circuit to generate signals in response to a REQ signal and an output signal from VCONP. VCONP is a circuit to determine whether the potential of VDDM is higher than a particular value, and VCONP can be implemented by a circuit similar to that of a sense amplifier in a memory. Sub-SW is a sub-power-switch used to bring the potential of VDDM3 closer to VDDH. FIG. 18 illustrates changes in the potential of VDDM3 when this circuitry is used. The input of REQ turns the sub-power-switch Sub-SW on, and the potential of VDDM3 increases gradually. This is shown by the area Sub-SW of FIG. 18. After the potential of VDDM3 reaches a particular value or higher, the voltage detection circuit VCONP detects that state and outputs the signal CSW of FIG. 14 used to turn the power switch on. With this, the power switch is turned on, and the local power supply wire VDDM3 is completely connected to VDDH. The circuitry then becomes ready for operation. This potential change is shown by the area Main-SW of FIG. 18. The sub-power-switch used here is lower in the capability to run voltages than the power supply unit of FIG. 14. In fact, the gate width of the PMOS transistor constituting the sub-power-switch is designed to have a small value than the gate width of the PMOS transistor constituting the power switch.

Figure 19:
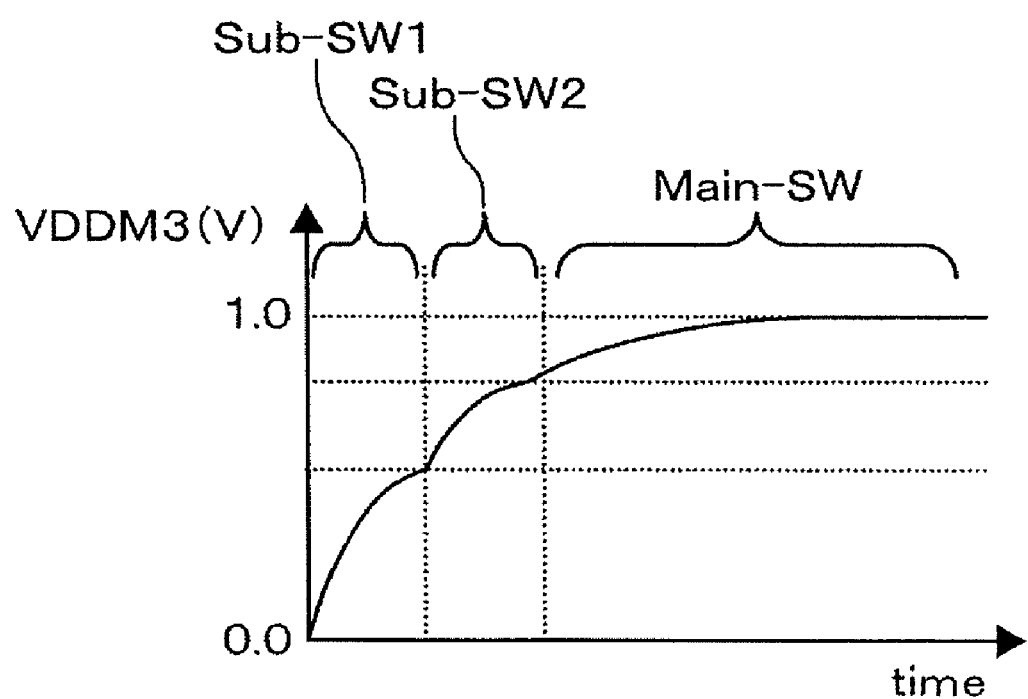
FIG. 19 is a graph illustrating changes in power supply voltage of an LSI chip according to the invention.

FIG. 19 illustrates the signal waveforms of the local power supply voltage VDDM when multiple sub-switches are provided. At particular timings, the number of the sub-switches to be used is changed. In the area Sub-SW1, part of the sub-switches are turned on. In the area Sub-SW2, the number of the sub-switches to be turned on is further increased. This detailed control of the sub-switches prevents noise in VDDH and makes it possible to turn the power switch on rapidly.

As stated above, Embodiment 1 allows high-speed operation and low power consumption in an LSI chip and also realizes an LSI chip with the minimized overhead of power supply wires.

Embodiment 2

Figure 20:
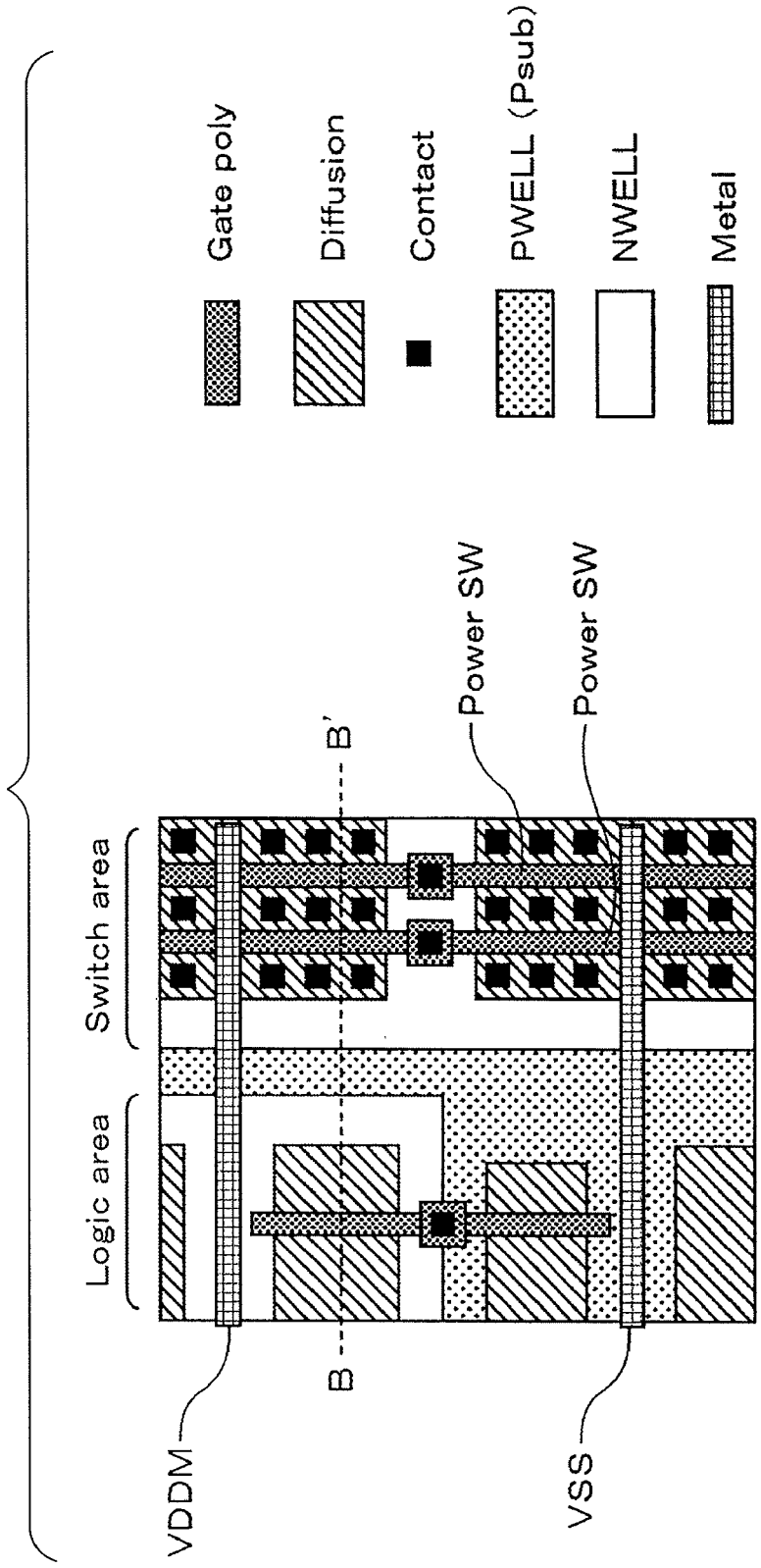
FIG. 20 illustrates an arrangement of power switches of an LSI chip according to the invention.
Figure 21:
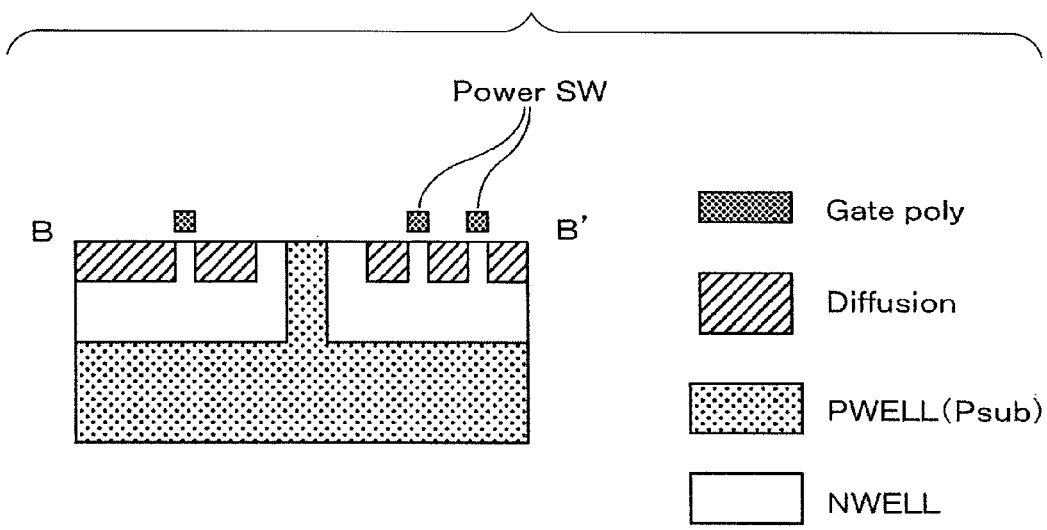
FIG. 21 is a cross-section of power switches of an LSI chip according to the invention.

FIG. 20 illustrates an arrangement of power switches according to Embodiment 2 in which a double well process is employed to achieve the configuration of Embodiment 1. In FIG. 20, 'Gate poly' represents the gate polysilicon of a transistor; 'Diffusion" a diffusion layer; 'Contact' a metal contact for connection between polysilicon or the diffusion layer and a metal wire; PWELL (Psub) a p-well or a p-substrate; NWELL an n-well or a deep n-well; and 'Metal" a metal wire. In FIG. 20, the left-side area (logic area) is the area in which logic circuits within a power domain is placed. The n-well to which the substrate terminals of its PMOS are connected is connected to a local power supply wire VDDM, as also illustrated in FIG. 7. The right-side area (switch area) of FIG. 20, on the other hand, is the area in which PMOS constituting a power switch is placed. The n-well to which the substrate terminals of its PMOS are connected is connected to a VDDH wire, as also illustrated in FIG. 7. Therefore, the n-well within the logic area needs to be electrically separated from the n-well within the switch area. In a double well structure with no deep n-wells, n-wells can be separated by placing a p-well or p-substrate therebetween. A cross-section taken along line A-A' of FIG. 20 is presented in FIG. 21. As can be seen from FIG. 21, a p-substrate between the switch area and the logic area separates the n-wells.

The use of the double well process reduces the area overhead of power switches more than the use of a tipple well process. Further, Embodiment 2 allows high-speed operation and low power consumption in an LSI chip and also realizes an LSI chip with the minimized overhead of power supply wires.

Embodiment 3

Figure 22:
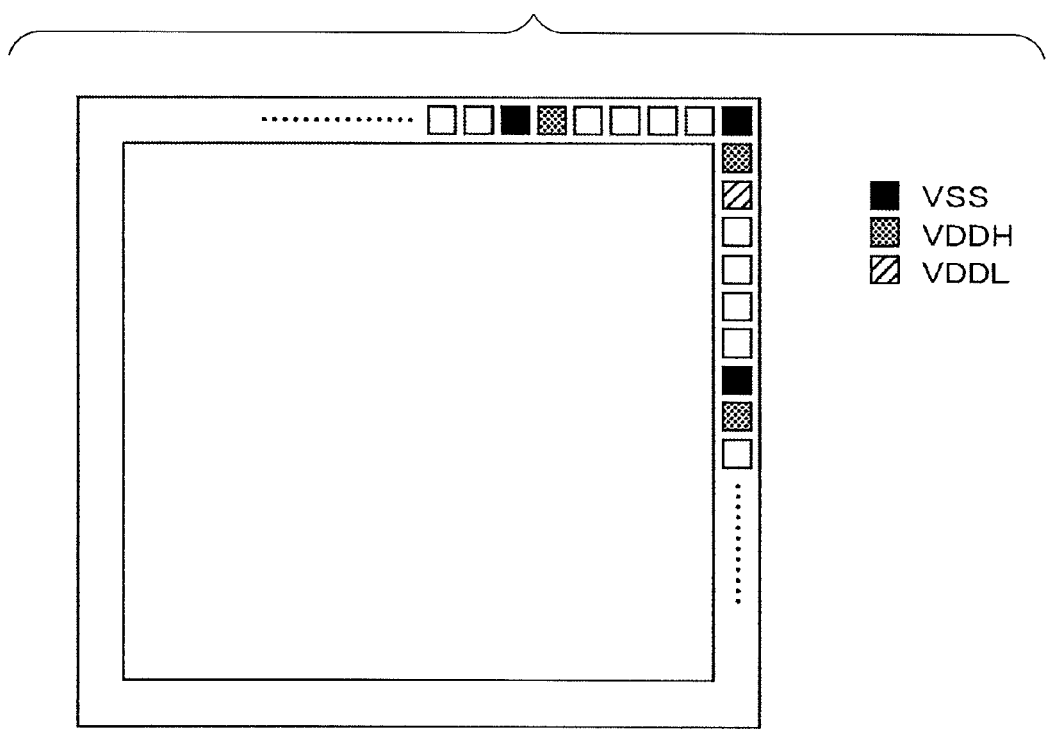
FIG. 22 illustrates an example of the allocation of metal bumps for power supply to an LSI chip according to the invention.

FIG. 22 illustrates an example of the allocation of power supply pads when the LSI chip of Embodiment 1 is implemented with the use of bonding pads. In an LSI chip with bonding pads, power supply pads are arranged at the periphery of the chip to input/output voltages or signals. These power supply pads are allocated unevenly among ground potential wires VSS, VDDH (high voltage) wires, and VDDL (low voltage) wires. In the case of a multi-voltage design with low and high voltages, modules that receive a low voltage consumes low power, and an electric current that needs to be supplied to the modules is also small. Accordingly, the number of power supply pads allocated for the VDDL wires is made smaller than the number of those allocated for the VDDH wires. This minimizes the number of power supply pads to be used.

Thus, Embodiment 3 allows high-speed operation and low power consumption in an LSI chip and also realizes an LSI chip with the minimized number of power supply pads.

Embodiment 4

Figure 23:
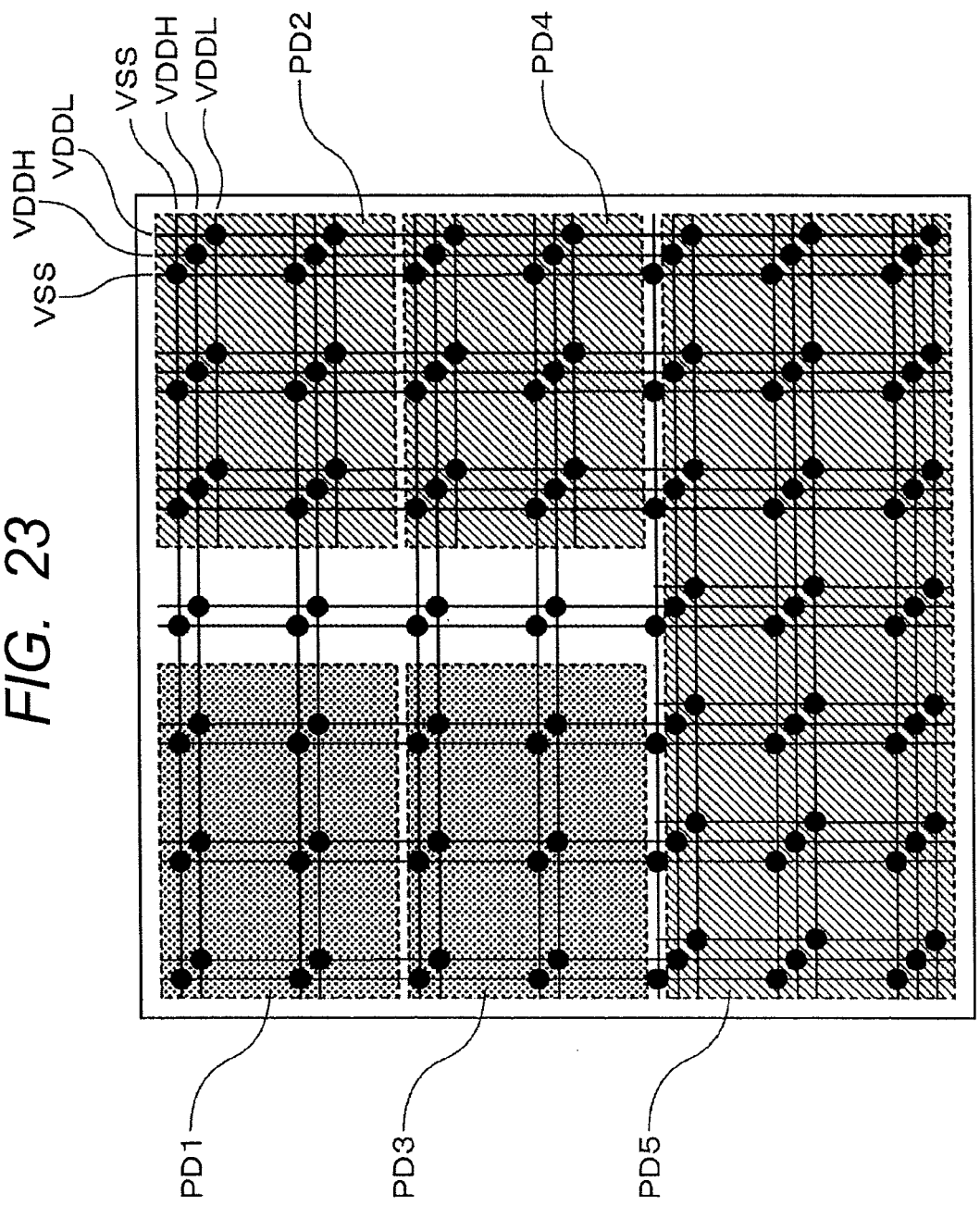
FIG. 23 is a diagram illustrating power supply wires of an LSI chip according to the invention.

FIG. 23 is an example of implementing the circuitry configuration of Embodiment 1 by different power supply wires. FIG. 23 illustrates wires on a relatively upper layer such as a metal eighth or ninth layer. The power domains PD1 and PD3 that are connected to VDDH only are arranged in the upper left portion of the LSI chip of FIG. 23. The power domains PD2, PD4, and PD5 that may be connected to VDDH and VDDL are arranged in the upper right and lower portions of the chip. At this time, the ground potential wires VSS and the high voltage wires VDDH are arranged across the entire chip because those wires are used in all the areas of the chip. In contrast, the low voltage wires VDDL are used only in the power domains PD2, PD4, and PD5. Thus, the wires VDDL are not arranged in the other areas than the power domains PD2, PD4, and PD5, but arranged in the upper right and lower portions of the chip.

Here, because VDDL is supplied to PD2 and PD4, on the face of it, it appears that the wires VDDH are not necessary for the upper right portion of the LSI chip. However, although not illustrated, common power domains CPD are actually arranged at various locations within the LSI chip, and the isolation buffers within PD2 and PD4 need VDDH. Thus, the wires VDDH are necessary across the entire chip. That is, the wires VDDH need to be arranged across the entire chip, and the wires VDDL are arranged only at necessary locations.

Thus, Embodiment 4 allows high-speed operation and low power consumption in an LSI chip and also realizes an LSI chip with the minimized overhead of power supply wires.

Embodiment 5

Figure 24:
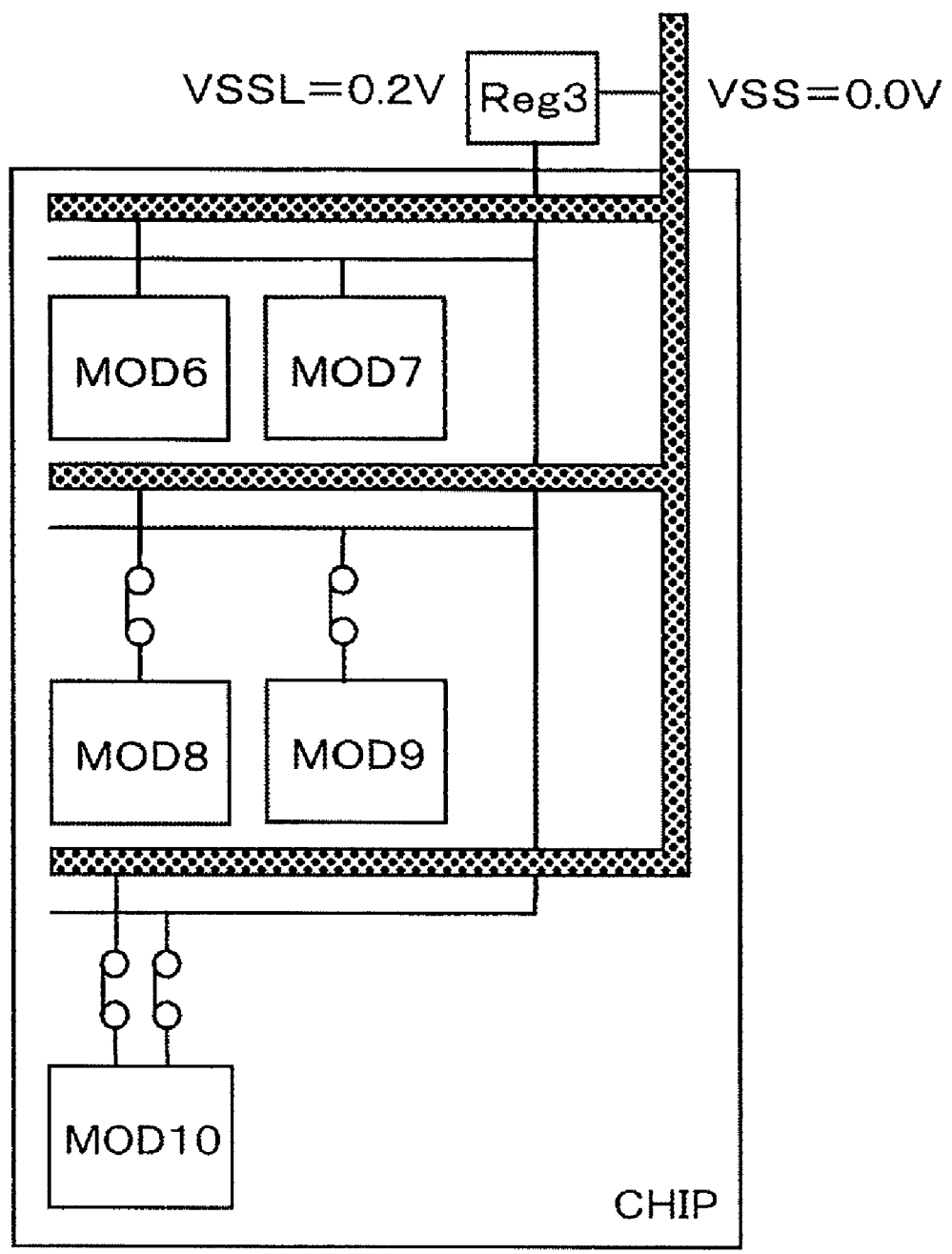
FIG. 24 is a diagram illustrating the internal structure of an LSI chip according to the invention and its system for supplying power to the LSI chip.

FIG. 24 illustrates the internal structure of an LSI chip according to Embodiment 5 of the invention and its system that supplies electric power to the chip. FIG. 24 differs from Embodiment 1 in that, although not illustrated, one power supply voltage is used as a power supply potential and that a voltage VSS of 0.0V and a voltage VSSL of 0.2V are used as ground potential voltages. The modules connected to VSSL are not high in operating speed as with the modules connected to VDDL in Embodiment 1, but power consumption can be reduced. In this configuration, VSS is supplied as a ground potential voltage, and the high voltage VSSL is supplied with the use of a power supply regulator Reg3.

Figure 25:
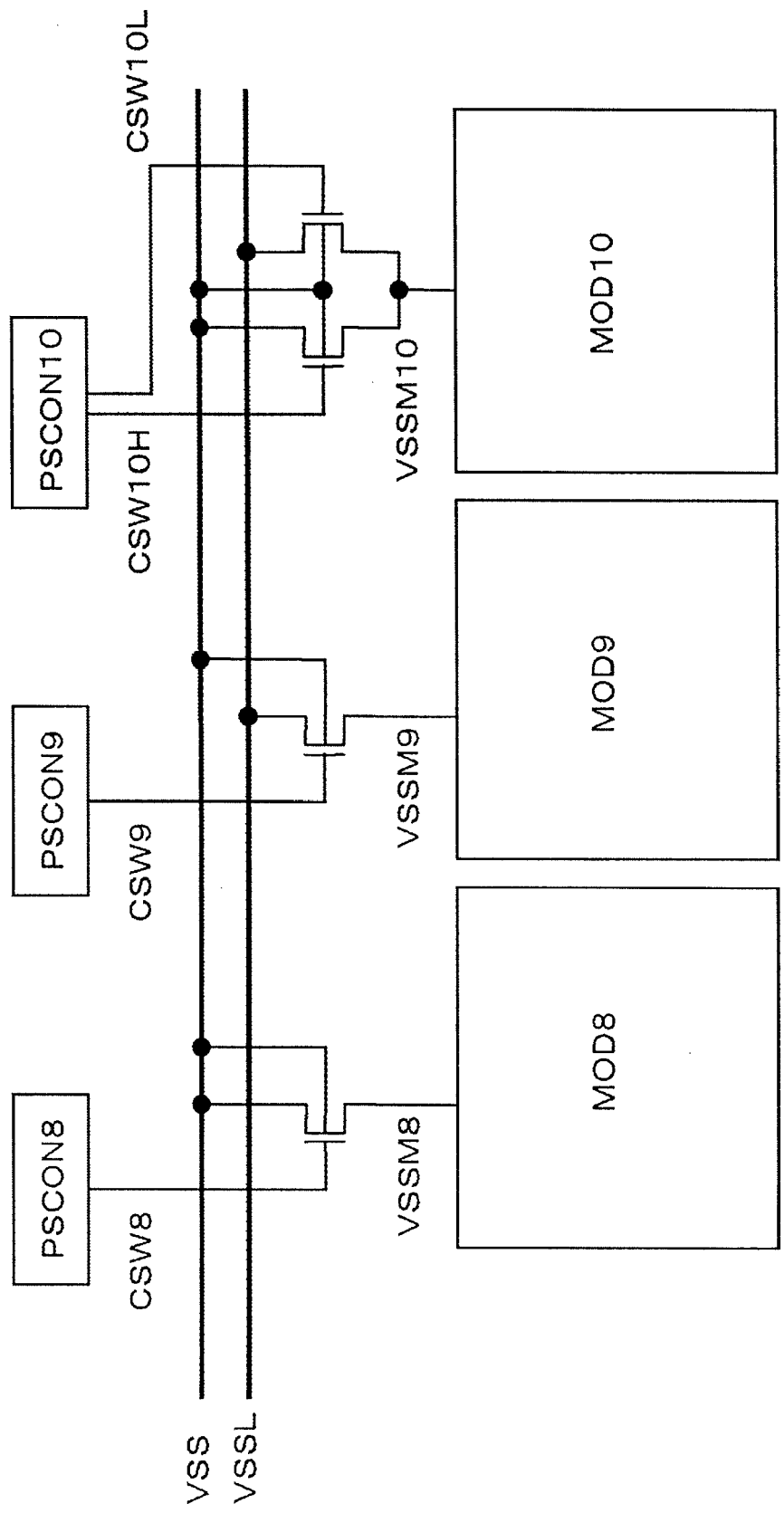
FIG. 25 illustrates the configuration of power switches of an LSI chip according to the invention.

FIG. 25 illustrates the configuration of power switches to implement the above configuration. In Embodiment 5, an NMOS power switch is used to control power supply on the ground potential side. The operation of this circuitry is substantially the same as in FIG. 7, except that the polarities of signals CSW8, CSW9, CSW10H, and CSW10L used to turn on the power switches are reversed due to the change from PMOS to NMOS. Power supply wires can be arranged similarly as in the other Embodiments described above.

Thus, Embodiment 5 allows high-speed operation and low power consumption in an LSI chip and also realizes an LSI chip with the minimized overhead of power supply wires.

Embodiment 6

Figure 26:
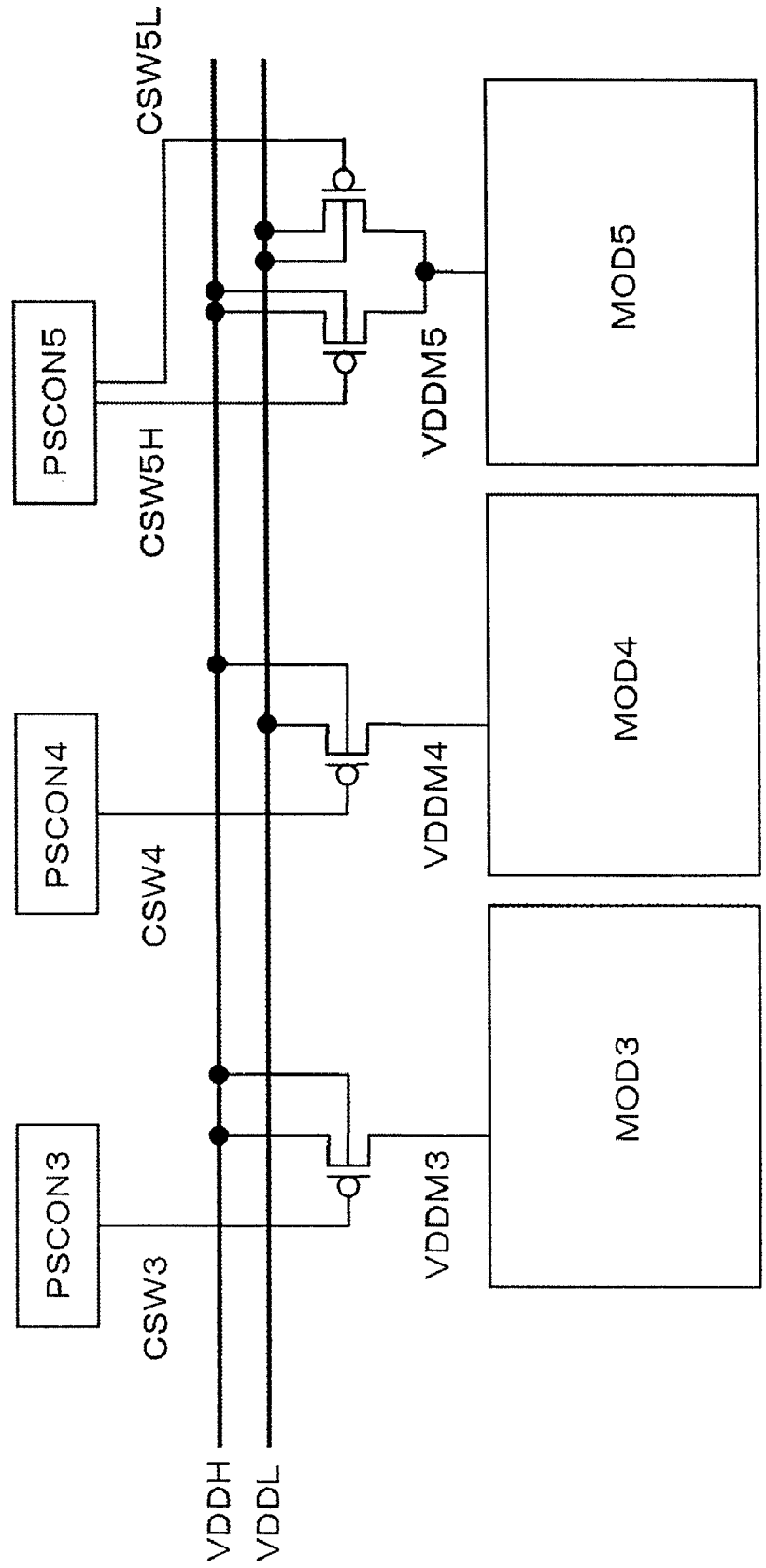
FIG. 26 is a diagram illustrating the relationship between power supply to an LSI chip according to the invention and power switches.

FIG. 26 illustrates the relationship between power supply to an LSI chip of Embodiment 6 and power switches. FIG. 26 differs from Embodiment 1 in that the substrate electrodes of the power switches connected to VDDL are connected to VDDL. In Embodiment 1, the substrate electrodes of the power switches connected to VDDL are connected to VDDH. Thus, reverse-directional substrate bias is applied to the PMOS transistors constituting the power switches. In Embodiment 6, however, substrate bias is not applied to the PMOS transistors constituting the power switches. Therefore, the resistance of the power switches is low, hence better power supply performance. This reduces the performance overhead associated with the power switches. Note however that this configuration results in an increase of the area overhead of the power switches because two types of wells of the power switches need to be separated.

As sated above, Embodiment 6 allows high-speed operation and low power consumption in an LSI chip and also prevents performance degradation due to power switches.

Embodiment 7

Figure 27:
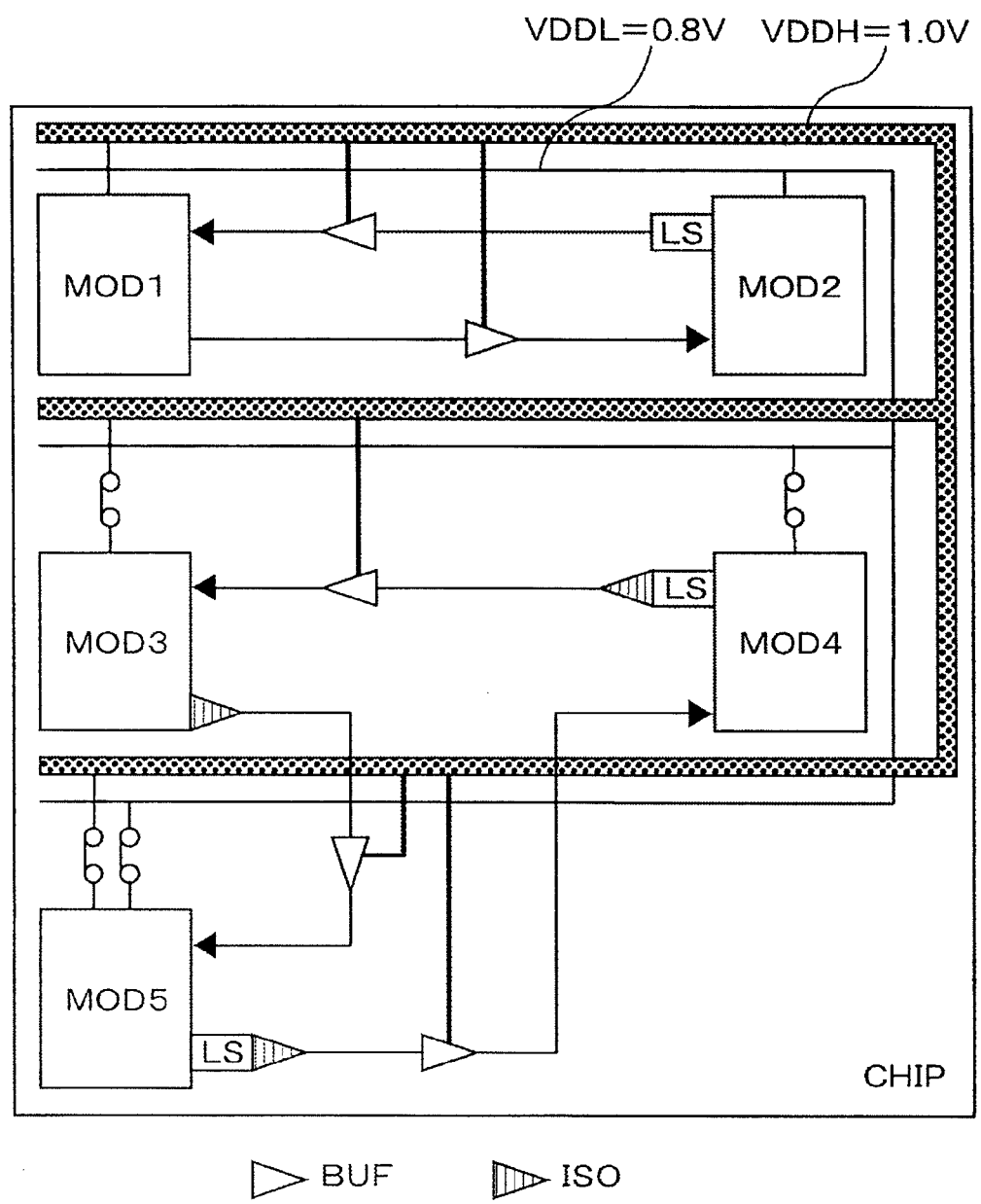
FIG. 27 is a diagram illustrating the relationship between an inter-module signal transfer scheme inside an LSI chip according to the invention and power supply.

FIG. 27 is a schematic illustrating the relationship between an inter-module signal transfer scheme inside an LSI chip of Embodiment 7 and power supply. FIG. 27 differs from Embodiment 1 in that level shifters are not inserted to signals which are input to the modules that receive a low voltage. Upon signal voltage translation from a low voltage to a high one, level shifters are a prerequisite for prevention of unstable operation or increase in propagation time. Upon high to low voltage translation, however, unstable operation or propagation time increases do not happen if the voltage difference is not so large. Thus, a configuration in which the potential difference between VDDH and VDDL is not so large does not necessitate the use of level shifters if a high voltage is translated to a low voltage, as in FIG. 27. In reality, if the potential difference is 0.3V or thereabout, signal propagation is possible without level shifters, which, of course, depends on LSI manufacturing processes. The absence of level shifters allows reduction of the area overhead associated with the level shifters and of the overhead of power supply wires that supply VDDH to the level shifters.

Thus, Embodiment 7 allows high-speed operation and low power consumption in an LSI chip and also realizes an LSI chip with the minimized overhead of power supply wires.

Embodiment 8

Figure 28:
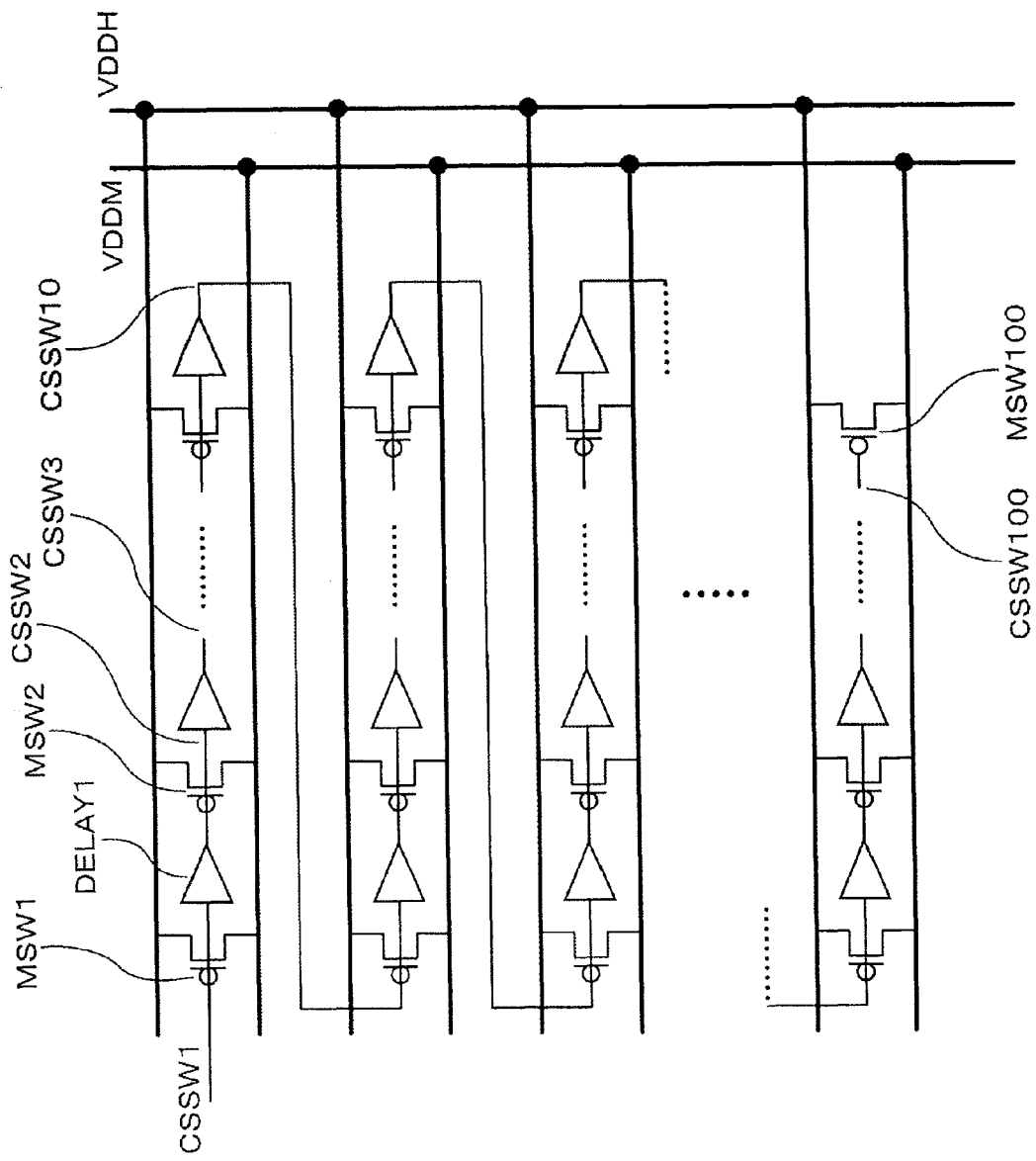
FIG. 28 is a diagram illustrating the configuration of power switches of an LSI chip according to the invention.

FIG. 28 illustrates a power switch control scheme for an LSI chip according to Embodiment 8. FIG. 28 differs from Embodiment 1 in that a power switch to shut off power is divided into multiple switches. MSW1 to MSW100 represent one hundred power switches, and CSSW1 to CSSW100 are signals used to control MSW1 to MSW100, respectively. DELAY1 is a delay element that imparts a particular delay time to a signal, VDDM is a local power voltage to be shut off, and VDDH is a high voltage. While, in Embodiment 8, power switches are divided into one hundred switches, the division number does not affect the effects of Embodiment 8. Also, Embodiment 8 is an example of connection to the high voltage VDDH; however, connection to the low voltage VDDL also results in the same effects.

Figure 29:
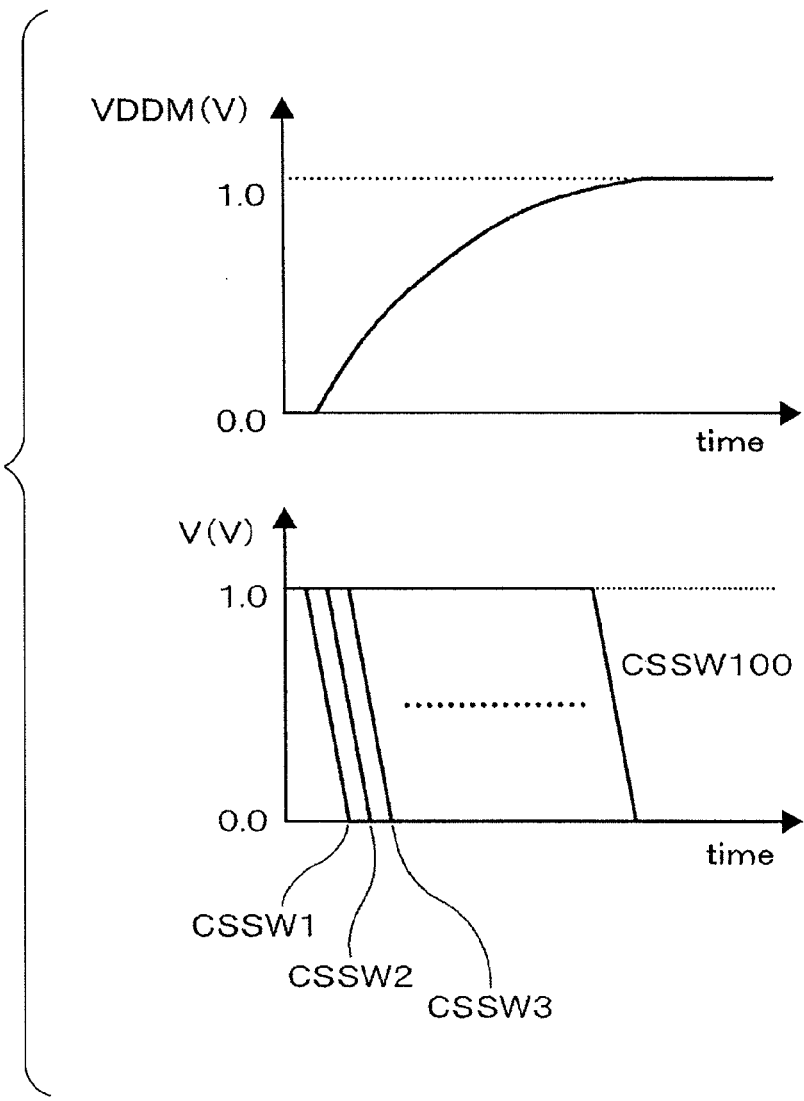
FIG. 29 is a diagram illustrating voltage changes in a switch control signal for an LSI chip according to the invention.

In FIG. 28, when the signal CSSW1 is input to control the switches, the first switch MSW1 is turned on. A delay time of ions or thereabout is imparted to CSSW1, and the signal CSSW2 used to control the second sub-switch is then generated to turn on the second power switch MSW2. When CSSW100 is generated to turn on the last switch MSW100 by repeating the above sequence, all the power switches are in an ON state. By the switches being turned on sequentially, it is possible to reduce supply voltage noise that results from charging the local power supply voltage VDDM. FIG. 29 illustrates the signal waveforms of the circuitry of FIG. 28. As can be seen from FIG. 29, CSSW1 to CSSW100 are sequentially turned on at particular delay intervals, and at the same time, the potential of the local power supply voltage VDDM gets closer to 1.0V.

While, in Embodiment 8, a divided power switch is represented by a transistor symbol, multiple transistors may be connected in parallel in an actual LSI chip. That is, when multiple transistors are controlled by one signal, multiple switches are actually arranged on a chip. However, FIG. 28 illustrates each of the switches by one transistor symbol.

Embodiment 8 allows high-speed operation and low power consumption in an LSI chip and also prevents noise during the control of the potential of a supply voltage.

Embodiment 9

Figure 30:
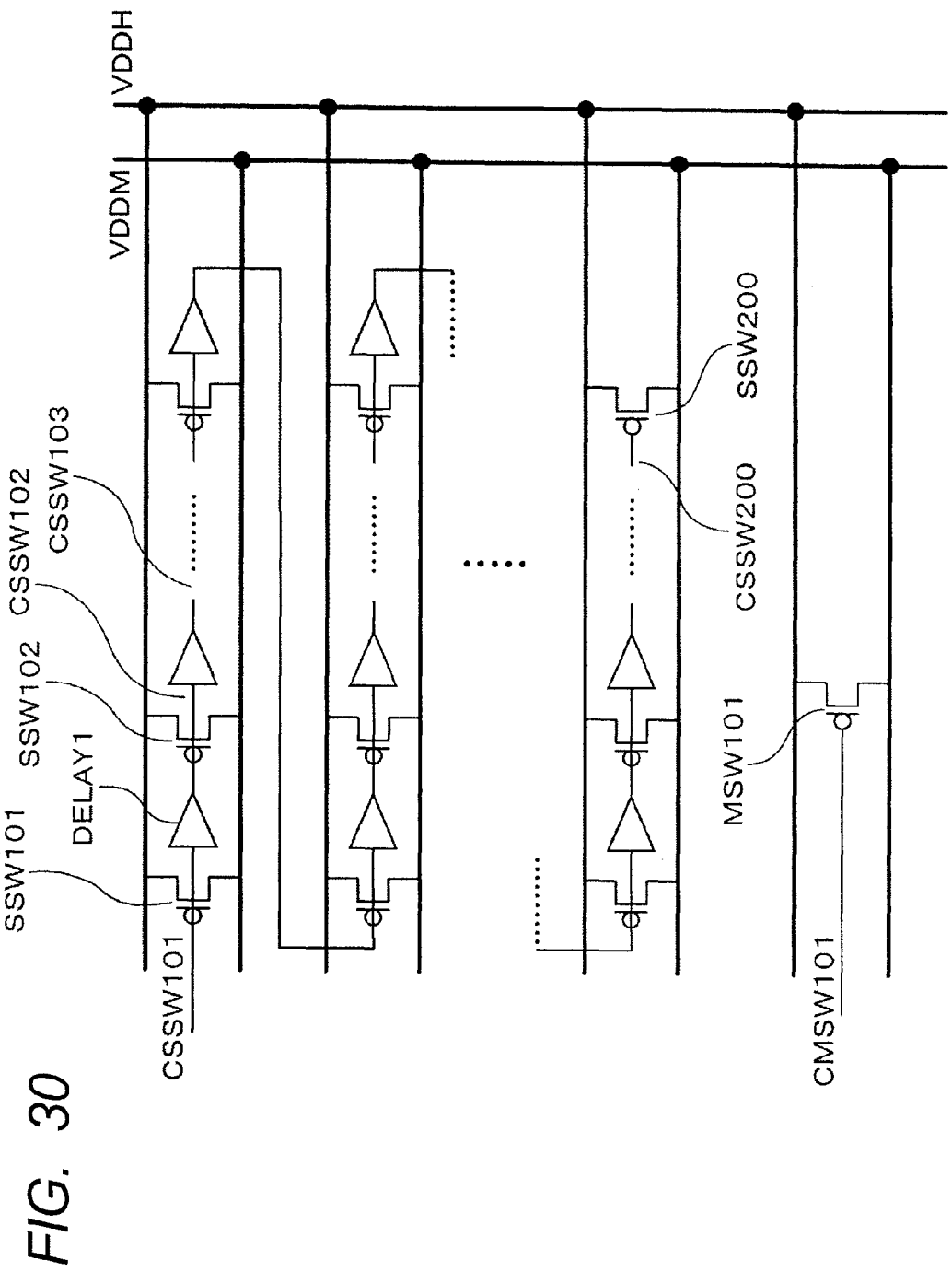
FIG. 30 is a diagram illustrating the configuration of power switches of an LSI chip according to the invention.

FIG. 30 illustrates a power switch control scheme for an LSI chip according to Embodiment 9. FIG. 30 differs from Embodiment 8 in that power switches to shut off power consist of divided multiple sub-switches and a main switch. SSW101 to SSW200 represent one hundred sub-switches, CSSW101 to CSSW200 are signals used to control SSW101 to SSW200, respectively, and MSW101 is a main switch. CMSW101 is a signal to control the main switch, and DELAY1 is a delay element that imparts a particular delay time to a signal. Further, VDDM is a local power voltage to be shut off, and VDDH is a high voltage. While, in Embodiment 9, power switches are divided into one hundred switches, the division number does not affect the effects of Embodiment 9. Also, Embodiment 9 is an example of connection to the high voltage VDDH; however, connection to the low voltage VDDL also results in the same effects.

In FIG. 30, when the signal CSSW101 is input to control the sub-switches, the first sub-switch SSW1 is turned on. A delay time of 10 ns or thereabout is imparted to CSSW101, and the signal CSSW102 used to control the second sub-switch is then generated to turn on the second sub-switch SSW102. When CSSW200 is generated to turn on the last sub-switch SSW200 by repeating the above sequence, all the sub-switches are in an ON state. By the sub-switches being turned on sequentially, it is possible to reduce supply voltage noise that results from charging the local power supply voltage VDDM. Thereafter, the signal CMSW101 is generated to turn on the main switch MSW101 larger in size than the sub-switches.

Figure 31:
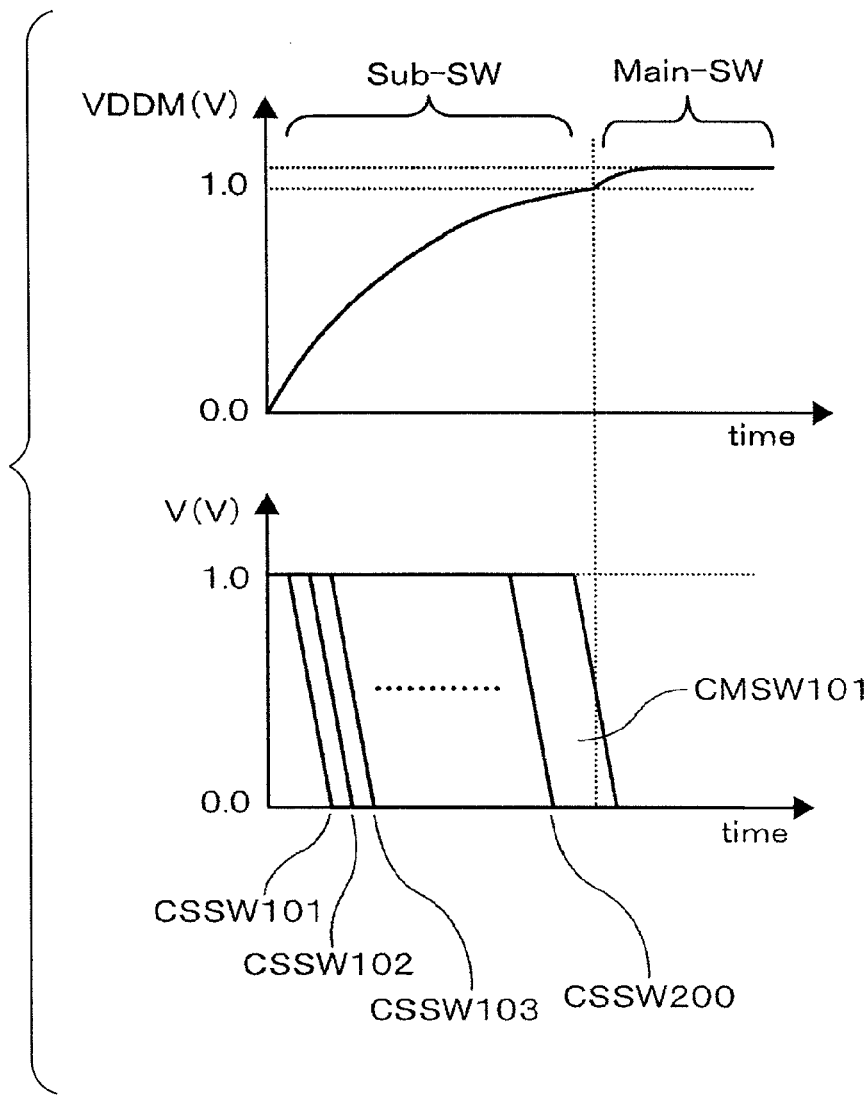
FIG. 31 is a diagram illustrating voltage changes in a switch control signal for an LSI chip according to the invention.

FIG. 31 illustrates the signal waveforms of the circuitry of FIG. 30. As can be seen from FIG. 31, CSSW101 to CSSW200 are sequentially turned on at particular delay intervals, and at the same time, the potential of the local power supply voltage VDDM gets closer to 1.0V. Further, the signal CMSW101 used to control the main switch is turned on after CSSW100 is turned on, and the potential of the local power supply voltage VDDM then becomes 1.0V, which is the potential of VDDH.

While, in Embodiment 9, a divided sub-switch and a main switch are each represented by a transistor symbol, multiple transistors may be connected in parallel in an actual LSI chip. That is, when multiple transistors are controlled by one signal, multiple switches are actually arranged on a chip. However, FIG. 30 illustrates each of the switches by one transistor symbol.

Embodiment 9 allows high-speed operation and low power consumption in an LSI chip and also prevents noise during the control of the potential of a supply voltage.

Embodiment 10

Figure 32:
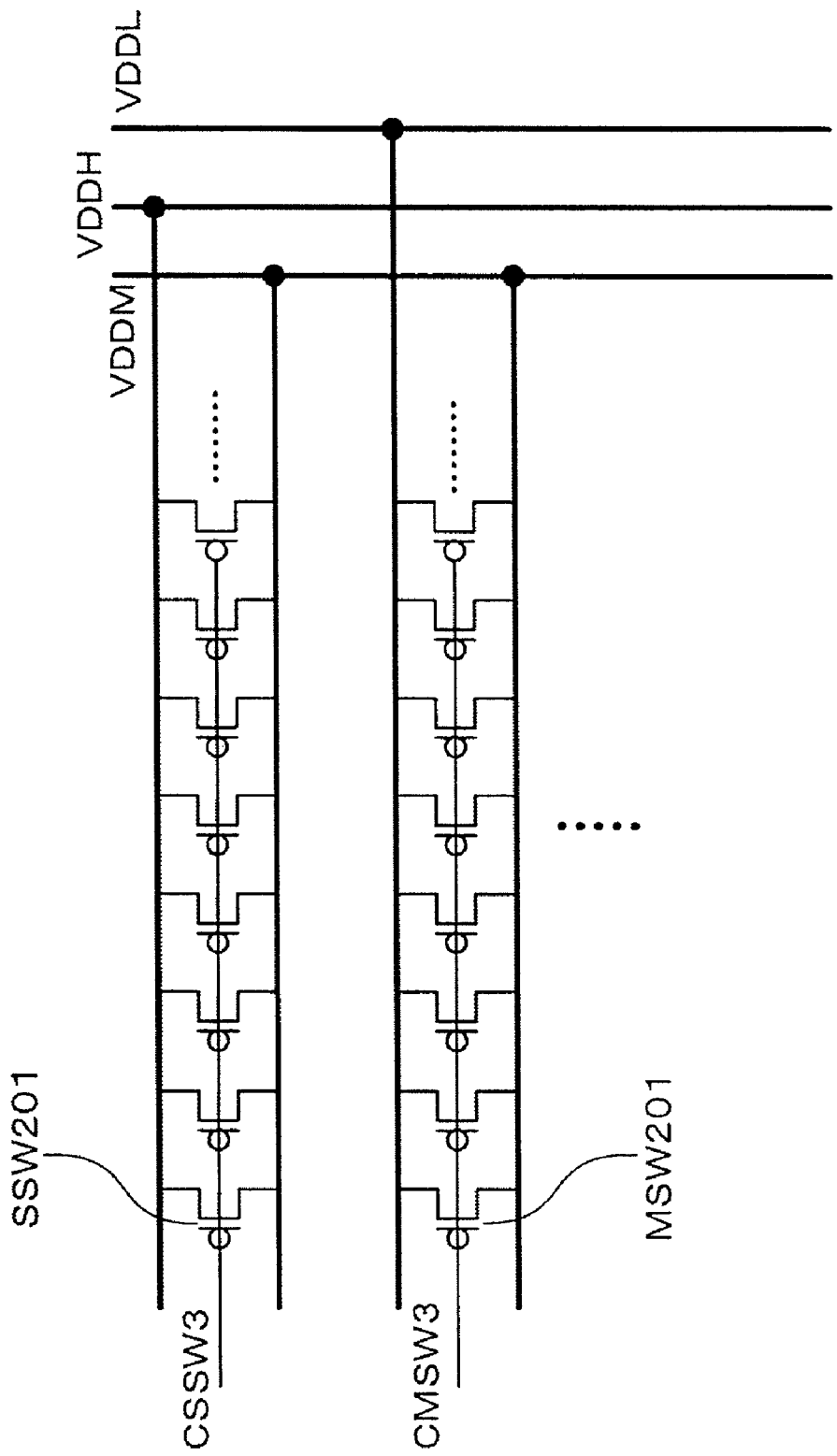
FIG. 32 is a diagram illustrating the configuration of power switches of an LSI chip according to the invention.

FIG. 32 illustrates a power switch control scheme for an LSI chip according to Embodiment 10 in which the local power supply voltage VDDM is driven by the same voltage as the low voltage VDDL. FIG. 32 differs from Embodiment 1 in that switches to control power supply are divided into sub-switches and main switches, that the source electrode of the sub-switches is connected to the high voltage VDDH, and that the source electrode of the main switches is connected to the low voltage VDDL. MSW201 represents a main switch, and CMSW3 is a signal to control the main switch. SSW201 is a sub-switch, and CSSW3 is a signal to control the sub-switch. Further, VDDM is a local power voltage to be shut off, VDDH is a high voltage, and VDDL is a low voltage. In Embodiment 10, a VDDL wire is smaller in physical amount than a VDDH wire, and the parasitic capacitance imparted to VDDL is smaller than those imparted to VDDH. Thus, the modules connected to VDDL are low in resistance against supply voltage noise that results when a power switch is turned on after power shut-off.

Figure 33:
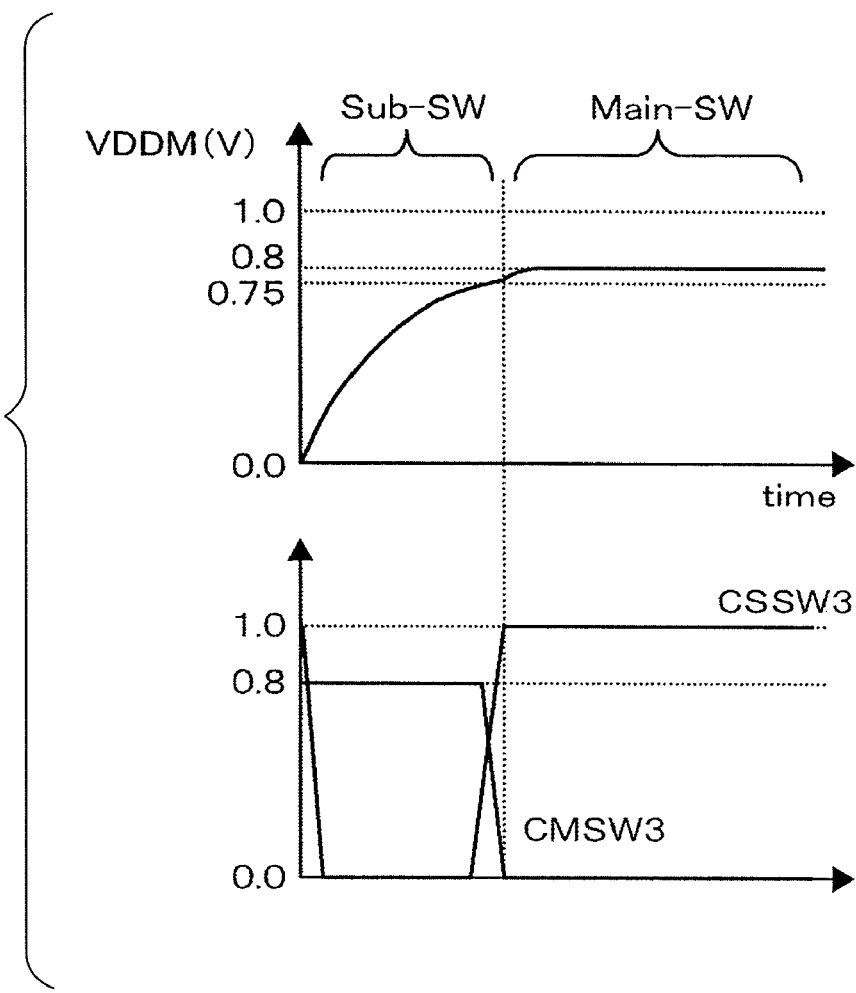
FIG. 33 is a diagram illustrating voltage changes in a switch control signal for an LSI chip according to the invention.

FIG. 33 illustrates the signal waveforms of the circuitry of FIG. 32. When the signal CSSW3 used to control the sub-switch becomes 'L,' the sub-switch SSW201 connected to VDDH is turned on. Subsequently, the potential of the local power supply voltage VDDM increases. When the potential of VDDM gets closer to the potential of VDDL, the sub-switch SSW201 is turned off, and the main switch MSW201 is turned on. With this operation, the potential of the local power supply voltage VDDM becomes the potential of VDDL, thereby enabling normal operation. In this case, the noise resulting from charging the local power supply voltage is input to VDDH, but influences of the noise can be suppressed because the parasitic capacitance of VDDH is larger than that of VDDL.

In Embodiment 10, one switch is illustrated by multiple transistor symbols. In this manner, multiple transistors are connected in parallel in an actual LSI chip.

Embodiment 10 allows high-speed operation and low power consumption in an LSI chip and also prevents noise during the control of the potential of a supply voltage.

Embodiment 11

Figure 34:
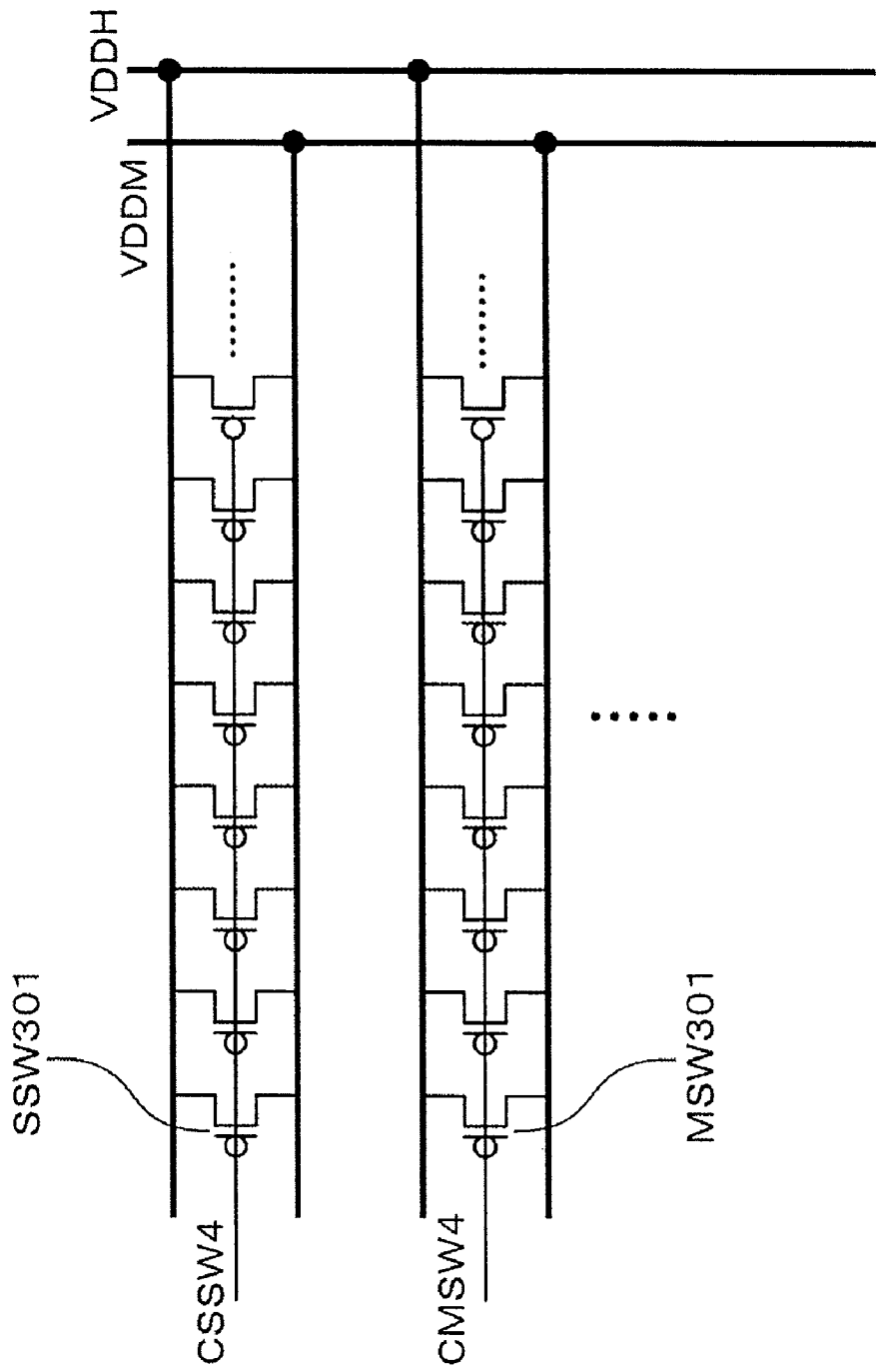
FIG. 34 is a diagram illustrating the configuration of power switches of an LSI chip according to the invention.

FIG. 34 illustrates a power switch control scheme for an LSI chip according to Embodiment 11. In FIG. 34, MSW301 represents a main switch, and CMSW4 is a signal to control the main switch. SSW301 is a sub-switch, and CSSW4 is a signal to control the sub-switch. Further, VDDM is a local power voltage to be shut off, and VDDH is a high voltage.

Figure 35:
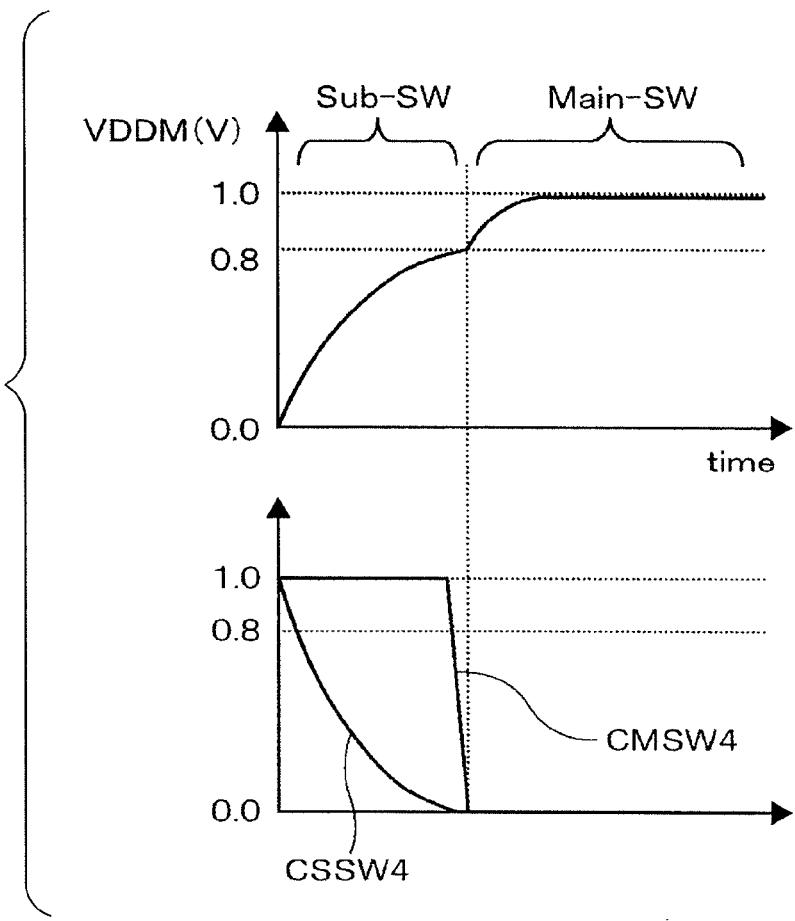
FIG. 35 is a diagram illustrating voltage changes in a switch control signal for an LSI chip according to the invention.

FIG. 35 illustrates the signal waveforms of the circuitry of FIG. 34. The signal CSSW4 used to control the sub-switch has the potential of 'H' (1.0V) at the time of power shut-off. When the power shut-off is stopped, however, the signal CSSW4 decreases gradually from 1.0V. Subsequently, the potential of the local power supply voltage VDDM increases. When the potential of VDDM gets closer to the potential of VDDL, the main switch MSW301 is turned on. With this operation, the potential of the local power supply voltage VDDM becomes the potential of VDDH, thereby enabling normal operation. Upon power return after power shut-off, by gradually changing the gate potential of the sub switch, the amount of an electric current flowing into a VDDM wire changes slowly. Thus, supply voltage noise resulting from power return can be prevented.

Figure 36:
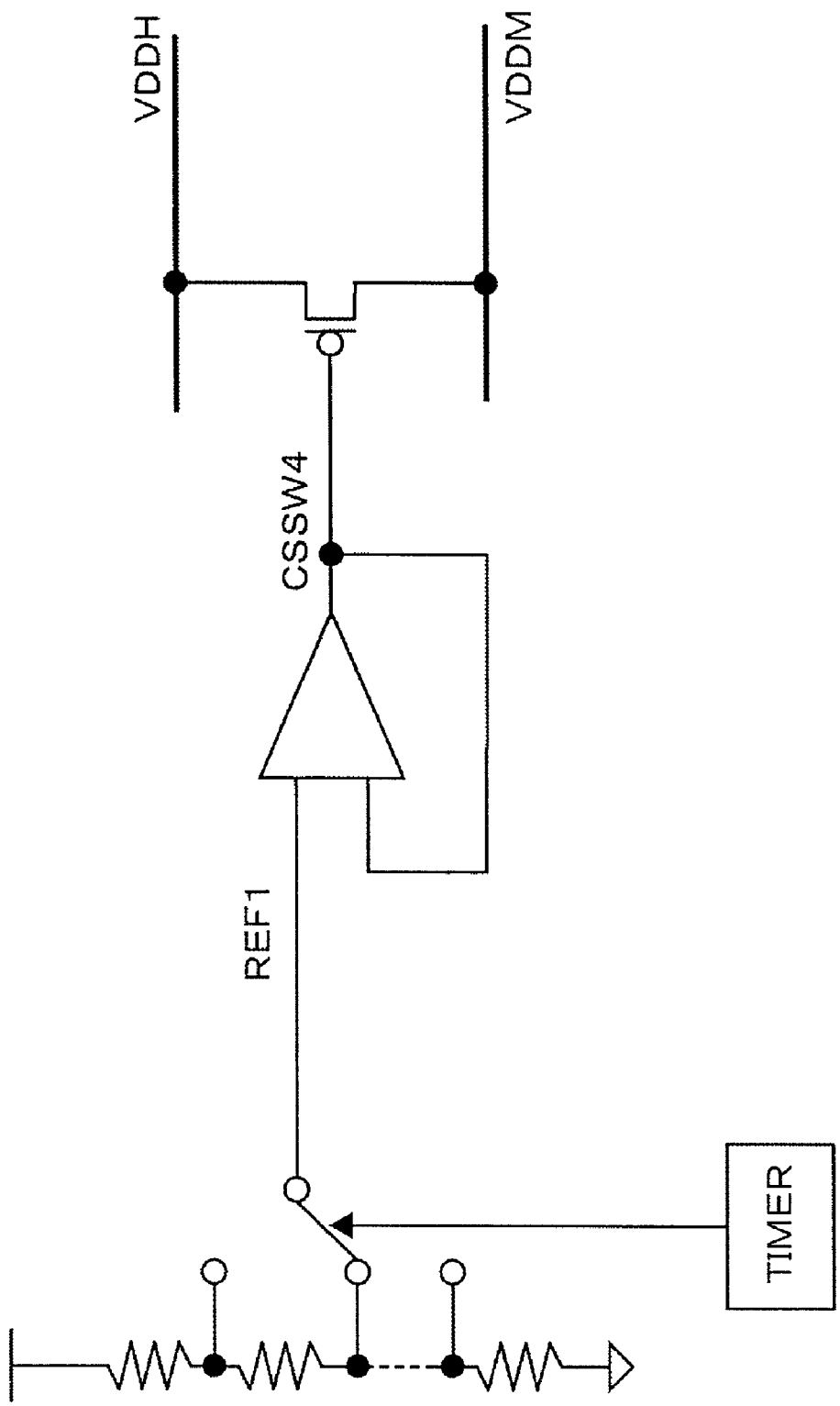
FIG. 36 is a diagram illustrating a power switch control circuit of an LSI chip according to the invention.

FIG. 36 illustrates a circuit to control CSSW4 of Embodiment 11. A reference potential REF1 is generated by using a timer to switch voltages generated from resistance division. Because the potential REF1 changes slowly, the signal CSSW4 to control the sub-switch changes as in FIG. 35.

Embodiment 11 allows high-speed operation and low power consumption in an LSI chip and also prevents noise during the control of the potential of a supply voltage.

What is claimed is:

1. A semiconductor device comprising:
   a first circuit block having a first function, the first circuit block being connected to a first power source and a third power source;
   a second circuit block having a second function, the second circuit block being connected to a second power source and the third power source; and
   power supply wires through which to supply electric power to a circuit including the first and second circuit blocks;
   wherein a voltage from the first power source is higher than a voltage from the second power source,
   wherein a voltage from the third power source is lower than the voltages from first and second power sources, and
   wherein the density of power supply wires of the first power source and the density of power supply wires of the second power source are different.

2. The semiconductor device of claim 1,
   wherein the density of the power supply wires of the first power source is greater than the density of the power supply wires of the second power source.

3. The semiconductor device of claim 2,
   wherein the first circuit block includes a switch to shut off power supply from the first power source and wherein the second circuit block includes a switch to shut off power supply from the second power source.

4. The semiconductor device of claim 3,
   wherein the first circuit block is connected to the first and second power sources via different switches.

5. The semiconductor device of claim 3,
   wherein circuits not included in the first and second circuit blocks are connected to the first power source.

6. The semiconductor device of claim 3,
   wherein a level shifter is provided for a signal output from the second circuit block connected to the second power source.

7. The semiconductor device of claim 6,
   wherein a level shifter is provided for a signal input to the second circuit block connected to the second power source.

8. The semiconductor device of claim 3,
   further comprising a circuit with a function of clamping the value of an output signal from the first circuit block connected via the switch to the first power source or from the second circuit block connected via the switch to the second power source.

9. The semiconductor device of claim 3,
   wherein the switches each are made of a PMOS transistor on the substrate.

10. The semiconductor device of claim 9,
    wherein a substrate terminal of a PMOS transistor is connected to a substrate terminal of another PMOS transistor used in a circuit block that does not belong to the circuit block to which is connected the switch made of the former PMOS transistor.

11. The semiconductor device of claim 9,
    wherein substrate terminals of the PMOS transistors which consist of the power switch are connected to the first power source.

12. The semiconductor device of claim 3,
    wherein a power source of a circuit block to which the first power source is connected without the switch is connected to a power source of a circuit block different from the former circuit block with the use of a metal wire on a bottom layer of the substrate and
    wherein a power source of a circuit block that includes the switch and a circuit block to which the second power source is connected is not connected to a power source of a circuit block different from the former circuit block via a metal wire on the bottom layer of the substrate.

13. The semiconductor device of claim 3,
    wherein a circuit block to which the first power source is connected without the switch is placed in an n-well on the substrate, the n-well being integrally formed with an n-well of a circuit block different from the former circuit block and
    wherein an n-well in which is placed a circuit block having the switch and a circuit block to which the second power source is connected is electrically separated from an n-well of a circuit block different from the former circuit block.

14. The semiconductor device of claim 3,
    wherein memory cells of a static memory mounted on the second circuit block are connected to the first power source.

15. The semiconductor device of claim 14,
    wherein a word line drive circuit of a static memory mounted on the second circuit block is connected to the first power source.

16. The semiconductor device of claim 3,
    wherein the switch is placed within the first or second circuit block that shuts off the first or second power sources.

17. An information processing apparatus comprising:
    a first power generating circuit for supplying first power;
    a second power generating circuit for supplying second power;
    power supply wires through which to supply the first and second powers of the first and second power generating circuits; and
    a substrate on which to form the first and second power generating circuits and the power supply wires,
    wherein the apparatus has an integrated circuit in which the density of power supply wires connected to the first power generating circuit and the density of power supply wires connected to the second power generating circuit are different, and
    wherein the integrated circuit includes a circuit for storing device information and wherein the voltages of the first and second powers from the first and second power generating circuits are changed by a signal generated based upon the device information.

18. The information processing apparatus of claim 17,
    wherein the signal is generated based upon data stored by a nonvolatile memory circuit on the integrated circuit.

19. The information processing apparatus of claim 17,
    wherein the first power from the first power generating circuit and the second power from the second power generating circuit are supplied to the integrated circuit via metal bumps on the integrated circuit and wherein the number of metal bumps for supplying the first power is different from the number of metal bumps for supplying the second power.

* * * * *